US006932557B2

(12) United States Patent
Downs et al.

(10) Patent No.: US 6,932,557 B2
(45) Date of Patent: Aug. 23, 2005

(54) GRIPPING MECHANISMS, APPARATUS, AND METHODS

(75) Inventors: Robert Charles Downs, La Jolla, CA (US); Mark Richard Weselak, San Diego, CA (US); James Kevin Mainquist, San Diego, CA (US)

(73) Assignee: IRM, LLC, Hamilton (BM)

( * ) Notice: Subject to any disclaimer, the term of this patent is extended or adjusted under 35 U.S.C. 154(b) by 0 days.

(21) Appl. No.: 10/620,324

(22) Filed: Jul. 14, 2003

(65) Prior Publication Data

US 2004/0086368 A1 May 6, 2004

Related U.S. Application Data

(63) Continuation-in-part of application No. PCT/US02/06096, filed on Feb. 26, 2002, which is a continuation-in-part of application No. 09/793,254, filed on Feb. 26, 2001, now Pat. No. 6,592,324.

(51) Int. Cl.[7] .............................................. B25J 15/00
(52) U.S. Cl. ................... 414/741; 414/730; 414/936; 414/941; 294/104; 294/119.1; 294/902; 901/31; 901/35; 901/39
(58) Field of Search ................... 414/741, 730, 414/744.3, 744.6, 936, 941; 901/31, 39, 35, 49; 294/119.1, 902, 907, 167, 104

(56) References Cited

U.S. PATENT DOCUMENTS

| 3,824,674 | A | 7/1974 | Inoyama et al. |
| 4,465,416 | A | 8/1984 | Burkhalter et al. |
| 4,616,414 | A | 10/1986 | Cushman |
| 4,662,811 | A | 5/1987 | Hayden |
| 4,714,865 | A | 12/1987 | Chin et al. |
| 4,715,637 | A | 12/1987 | Hosoda et al. |
| 4,894,103 | A | 1/1990 | Bailey |

(Continued)

FOREIGN PATENT DOCUMENTS

| EP | 0 975 009 A1 | 1/2000 |
| GB | 2185458 A | 7/1987 |

*Primary Examiner*—Douglas Hess
(74) *Attorney, Agent, or Firm*—Timothy L. Smith; Christopher C. Sappenfield; Quine Intellectual Property Law Group, P.C.

(57) ABSTRACT

The present invention provides grasping mechanisms, gripper apparatus/systems, and related methods. Grasping mechanisms that include stops, support surfaces, and height adjusting surfaces to determine three translational axis positions of a grasped object are provided. In addition, grasping mechanisms that are resiliently coupled to other gripper apparatus components are also provided.

51 Claims, 20 Drawing Sheets

U.S. PATENT DOCUMENTS

| | | | |
|---|---|---|---|
| 4,900,078 A | * | 2/1990 | Bloch ..................... 294/86.4 |
| 4,923,054 A | | 5/1990 | Ohtani et al. |
| 4,944,650 A | | 7/1990 | Matsumoto |
| 4,952,115 A | | 8/1990 | Ohkase |
| 4,976,484 A | | 12/1990 | Nomaru et al. |
| 5,022,695 A | | 6/1991 | Ayers |
| 5,061,144 A | | 10/1991 | Akimoto et al. |
| 5,062,756 A | | 11/1991 | McArthur et al. |
| 5,100,285 A | | 3/1992 | Wagner |
| 5,162,047 A | | 11/1992 | Wada et al. |
| 5,192,106 A | | 3/1993 | Kaufman |
| 5,201,501 A | | 4/1993 | Fassler |
| 5,253,911 A | | 10/1993 | Egan et al. |
| 5,308,222 A | | 5/1994 | Bacchi et al. |
| 5,328,224 A | | 7/1994 | Jacobsen et al. |
| 5,445,486 A | | 8/1995 | Kitayama et al. |
| 5,541,485 A | | 7/1996 | Teichmann et al. |
| 5,543,022 A | | 8/1996 | Nguyen et al. |
| 5,549,444 A | | 8/1996 | Dubuit |
| 5,669,644 A | | 9/1997 | Kaihotsu et al. |
| 5,697,480 A | | 12/1997 | Herbermann et al. |
| 5,700,046 A | | 12/1997 | Van Doren et al. |
| 5,778,742 A | | 7/1998 | Stuart |
| 5,810,935 A | | 9/1998 | Lee et al. |
| 5,863,086 A | | 1/1999 | Christenson |
| 5,870,488 A | | 2/1999 | Rush et al. |
| 5,871,248 A | | 2/1999 | Okogbaa et al. |
| 5,944,476 A | | 8/1999 | Bacchi et al. |
| 5,945,798 A | | 8/1999 | Stagnitto et al. |
| 6,012,895 A | * | 1/2000 | Smith et al. ................. 414/810 |
| 6,015,174 A | | 1/2000 | Raes et al. |
| 6,116,848 A | | 9/2000 | Thomas et al. |
| 6,305,898 B1 | | 10/2001 | Yamagishi et al. |
| 6,322,119 B1 | | 11/2001 | Schmidt et al. |
| 6,409,241 B1 | | 6/2002 | Hughes et al. |
| 6,467,827 B1 | * | 10/2002 | Ardezzone ............... 294/119.3 |
| 6,474,712 B1 | | 11/2002 | Govzman et al. |
| 6,578,893 B2 | * | 6/2003 | Soucy et al. ............... 294/99.1 |
| 6,592,324 B2 | | 7/2003 | Downs et al. |

* cited by examiner

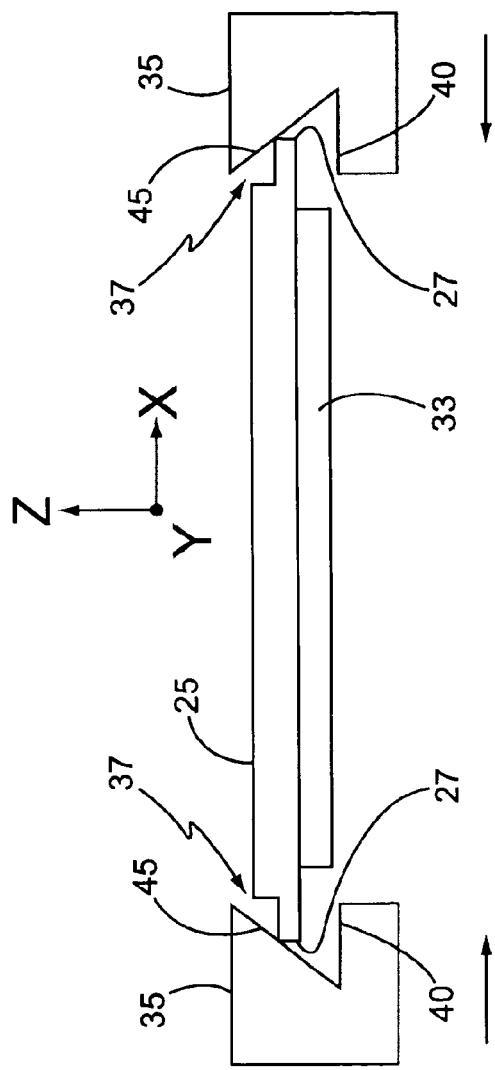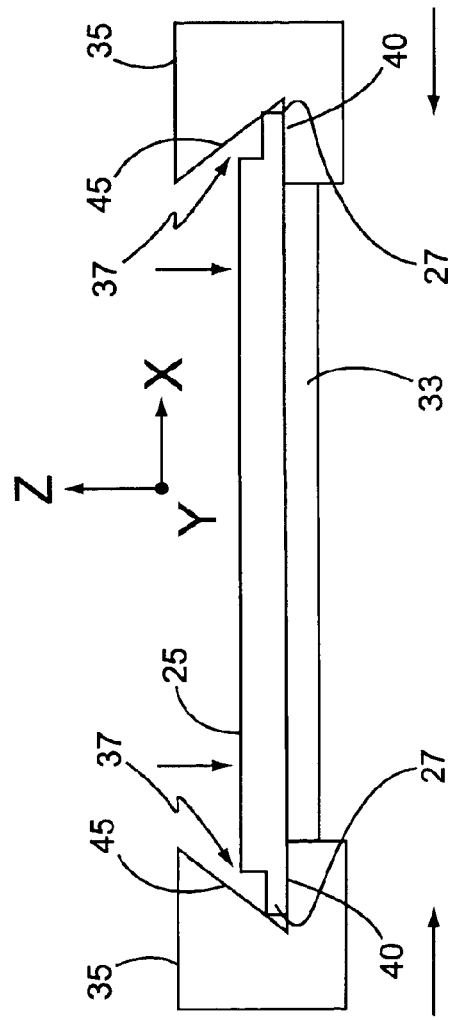

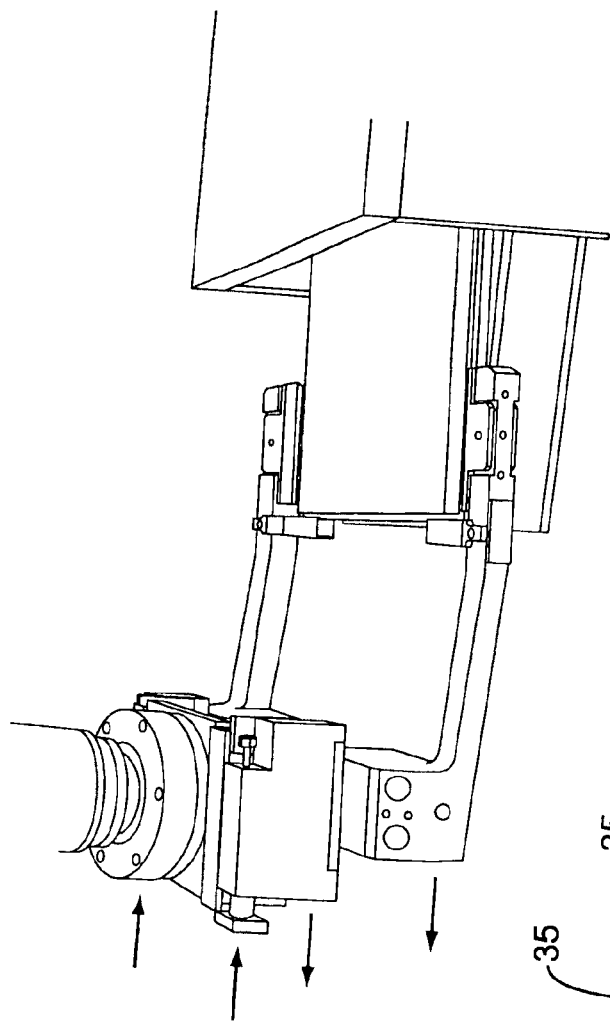
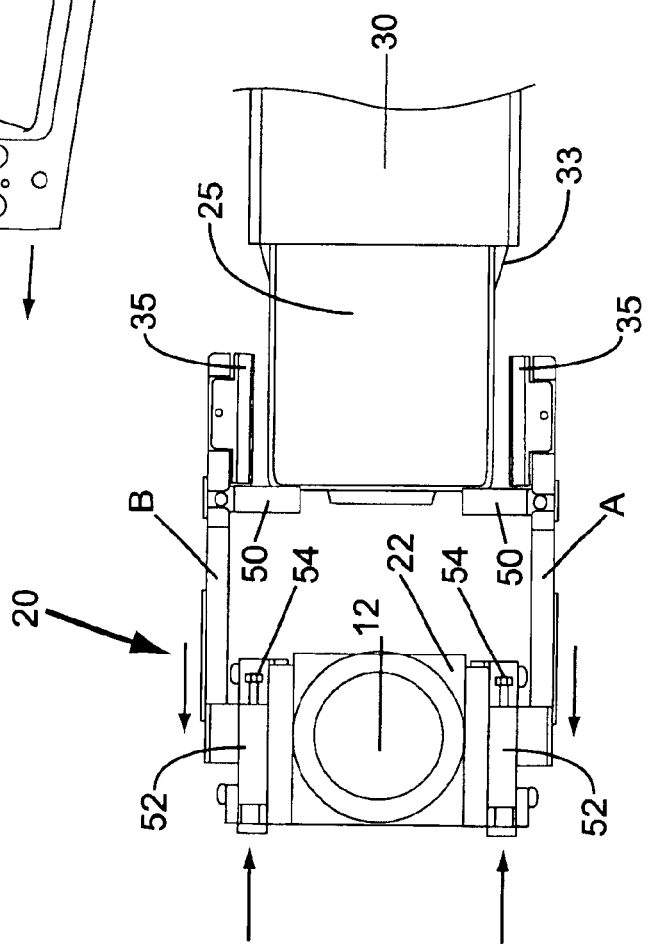
Fig. 14A
Fig. 14B

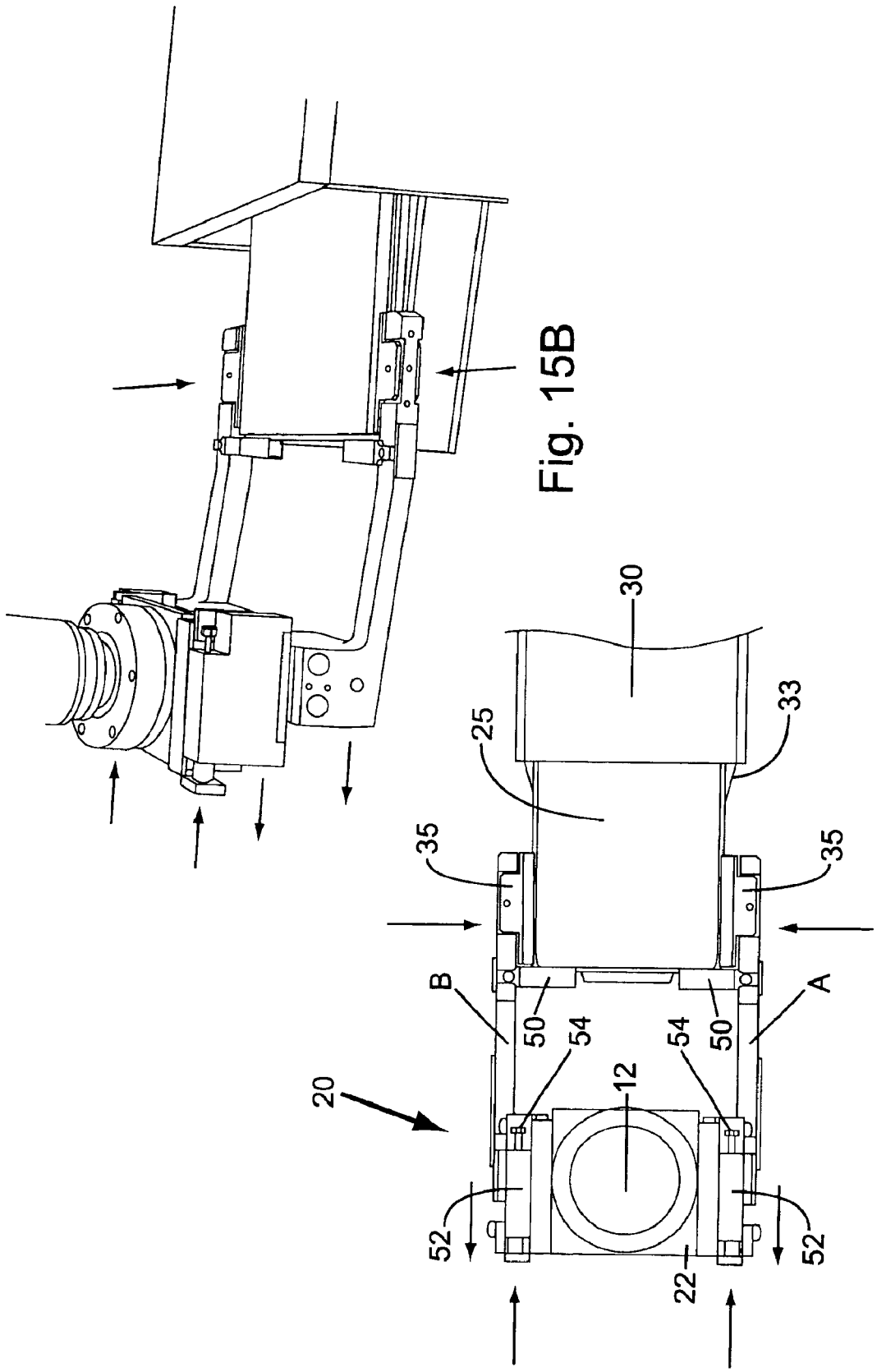

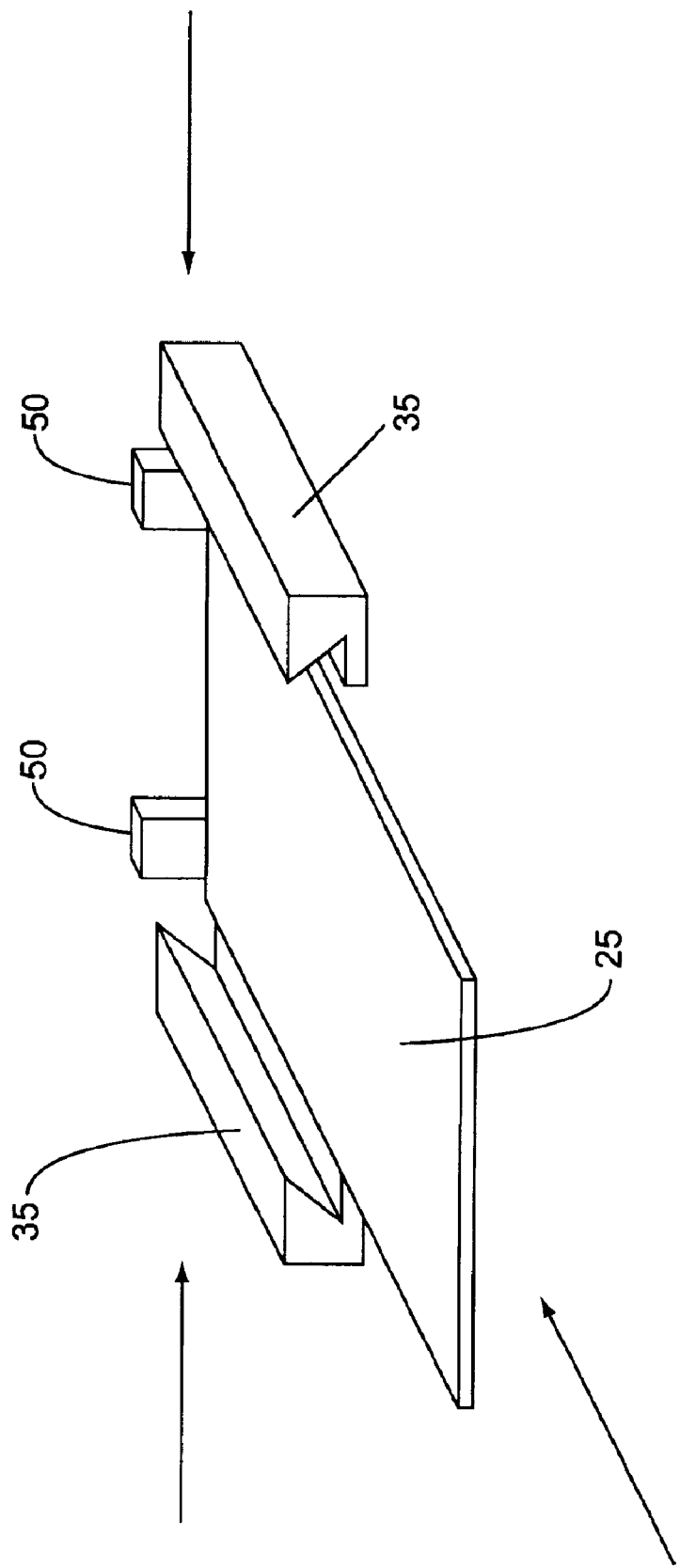

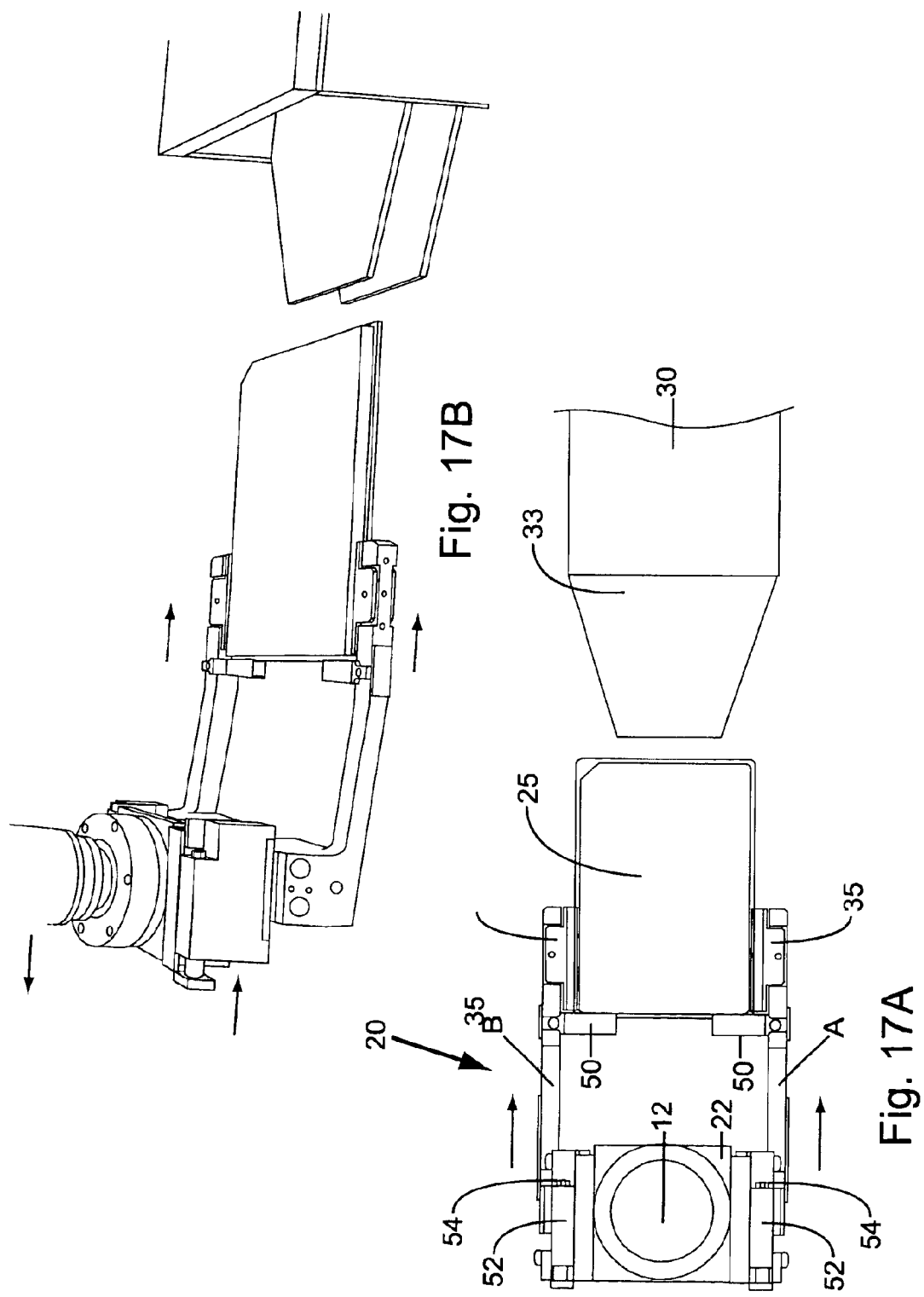

GRIPPING MECHANISMS, APPARATUS, AND METHODS

CROSS-REFERENCES TO RELATED APPLICATIONS

This application is a continuation-in-part of International Patent Application No. PCT/US02/06096, entitled "GRIPPER MECHANISMS, APPARATUS, AND METHODS," which was filed on Feb. 26, 2002 by Downs et al., which is a continuation-in-part of U.S. patent application Ser. No. 09/793,254, entitled "GRIPPER MECHANISM," which was filed on Feb. 26, 2001 now U.S. Pat. No. 6,592,324 by Downs et al., the disclosures of which are incorporated by reference.

COPYRIGHT NOTIFICATION

Pursuant to 37 C.F.R. §1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to gripping devices and methods. More specifically, the invention provides robotic apparatus and related methods to grasp and translocate objects.

BACKGROUND OF THE INVENTION

Many types of robotic devices have been constructed to perform tasks considered either too dangerous or monotonous to be performed by human operators. For example, robots can often perform certain repetitive tasks that generally lead humans to distraction and error. However, constructing a robotic system to reliably and quickly grasp and accurately position objects is not a trivial task.

Many industrial fields require the accurate positioning of an object for automated processing. In particular, the biotechnology industry is making rapid advances by transitioning from traditional laboratory bench top processes to more automated systems. These automated systems typically perform assays or screens using a sample plate, such as a microwell plate. Each sample plate typically includes multiple sample wells, generally ranging from a few to thousands of wells. As discrete tests can be performed in each sample well, hundreds or thousands of assays can be performed in each plate.

For a robotic or other automated system to perform with a high degree of reproducibility and sufficient throughput, the system generally needs to accurately, quickly, and reliably position individual sample plates for analysis or other processing. For example, sample plates must be accurately placed relative to liquid dispensers such that sample or reagent aliquots are deposited into specified wells. A positioning error of only a fraction of a millimeter can result in a sample being dispensed into an incorrect well. Such a mistake can lead to biased assay results which may be relied upon for critical decision making, such as a course of medical treatment for a patient. In addition, positioning errors can also cause needles or tips of liquid dispensers to unintentionally contact walls or other surfaces of a sample plate with a typical consequence being damage to the liquid dispenser.

Conventional automated or robotic devices typically do not operate with sufficient positioning accuracy, e.g., to reliably and repeatably position high-density sample plates for high-throughput processing. Additionally, conventional devices also typically require one or more re-gripping steps that further limit throughput. Accordingly, there exists a need for robotic or otherwise automated gripper apparatus and related methods for accurately, reliably, and quickly positioning objects such as sample plates for processing or other manipulation without intervening re-gripping steps. These and other features of the present invention will become apparent upon complete review of the following disclosure.

SUMMARY OF THE INVENTION

The present invention provides gripper apparatus, grasping mechanisms, and related methods for accurately grasping and manipulating objects with higher throughput than preexisting technologies. In certain embodiments, for example, grasping mechanisms are resiliently coupled to other gripper apparatus components. In other embodiments, grasping mechanism arms include support surfaces and height adjusting surfaces to determine x-axis and z-axis positions of objects being grasped. In certain other embodiments of the invention, grasping mechanism arms include pivot members that align with objects as they are grasped. In some of these embodiments, pivot members include the support surfaces and height adjusting surfaces. In other embodiments, the arms of grasping mechanisms include stops that determine y-axis positions of objects that are grasped. Essentially any combination of these and other embodiments, or components thereof, described herein are optionally utilized together.

In particular, the invention includes various related grasping mechanisms. For example, in one aspect the invention provides a grasping mechanism that includes movably coupled arms (e.g., two arms, etc.) in which the arms are movably coupled to each other such that the arms can move towards or away from each other along a first axis (e.g., along an x-axis, etc.). Further, the arms are attached to a body that comprises a resilient coupling which allows the arms to move in a direction substantially perpendicular to the first axis (e.g., along a y-axis, etc.). Although other configurations are optionally utilized (e.g., a grasp that is at least partially internal to an object, etc.), the grasping mechanism is typically structured to grasp the object between the arms. An interface (e.g., a sliding interface, etc.) between the arms and the body typically include at least one spring, which spring resiliently couples the arms to the body. In preferred embodiments, at least one arm includes a stop. In these embodiments, each arm typically includes the stop. Further, the stop is generally structured to determine a y-axis position of the object. In preferred embodiments, the y-axis position of the object is determined with an accuracy to within about 0.1 millimeters. Optionally, the stop includes at least one height adjusting surface and/or at least one support surface. In addition, at least a portion of the grasping mechanism generally includes a polished or coated surface (e.g., coated with TEFLON® or the like) that reduces friction between the object and the grasping mechanism relative to an unpolished or non-coated surface when the object is grasped by the arms. In some embodiments, the arms and/or other grasping mechanism components (e.g., stops, etc.) comprise one or more rollers that reduce friction between the object and the grasping mechanism, relative to arms that lack the rollers, when the object is grasped by the arms.

In preferred embodiments, one or more of the arms include at least one support surface and/or at least one height adjusting surface. For example, in one preferred embodiment, each support surface is disposed between two height adjusting surfaces, which height adjusting surfaces are angled to push the object into contact with the support surface when the object is grasped. The support surface and the height adjusting surface typically form a channel to grasp the object. In particular, the support surface generally includes a substantially horizontal surface to support the object and the height adjusting surface generally includes an angled surface that intersects with the substantially horizontal surface, which angled surface pushes the object into contact with the substantially horizontal surface when the arms grasp the object. Typically, the support surface determines an x-axis position of the object and the height adjusting surface determines a z-axis position of the object when the arms grasp the object. For example, the x-axis and z-axis positions of the object are generally determined with an accuracy to within about 0.1 millimeters. In addition, in some embodiments, the one or more arms include a pivot member, which pivot member includes the support surface and the height adjusting surface. In preferred embodiments, the pivot member is resiliently coupled to the arm, e.g., by one or more springs that couple the pivot member to the arm. In some embodiments, the arm further includes a stop in which the stop and the pivot member (e.g., individually or as a single unit) are resiliently coupled to the arm, e.g., by one or more operably connected springs or the like.

The grasping mechanism is generally movably connected to a boom, which boom is movably connected to a base. The boom typically rotates about 360 degrees. Also, the boom generally moves vertically and horizontally and optionally, extends and retracts. In addition, the boom and the base generally include a robot. The grasping mechanism typically further includes at least one controller operably connected to the grasping mechanism, which controller controls movement of the grasping mechanism. The controller typically further controls movement of the boom. The controller typically includes at least one logic device having one or more logic instructions that direct the grasping mechanism to contact the object such that the object is pushed against a push surface by a stop, whereby the resilient coupling allows the arms to reversibly recede from an initial position, and grasp at least a section of the object with the arms, after which the arms advance at least substantially back to the initial position. The arms typically each include a channel and the logic instructions optionally further direct the grasping mechanism to partially close prior to the contacting step to position the section of the object at least partially within the channel. The logic instructions typically further direct the grasping mechanism to remove the object from a first position and place the object at a second position.

In preferred embodiments, a deflectable member defectively couples the grasping mechanism to the boom. The deflectable member typically includes a breakaway (e.g., a collision sensor that detects angular, rotational, and/or compressive forces encountered by the grasping mechanism). To illustrate, the deflectable member deflects when the grasping mechanism contacts the object or another item with a force greater than a preset force. The preset force generally includes a torque force and/or a moment force that ranges between about 1.0 Newton-meter and about 10.0 Newton-meters. In addition, the grasping mechanism typically also includes at least one sensor that communicates with the controller, e.g., to determine a location of the gripper apparatus relative to the object. The sensor is optionally selected from, e.g., an optical sensor, a photoelectric sensor, an infrared sensor, a position sensor, a laser distance sensor, a magnetic sensor, or the like.

The invention also provides a grasping mechanism that includes arms that are resiliently coupled to a body by a resilient coupling and movably coupled to each other, which arms are structured to grasp an object. In addition, at least one arm includes a stop.

In another aspect, the invention provides a gripper apparatus that includes a robot that includes a boom. The gripper apparatus also includes a grasping mechanism including movably coupled arms (e.g., two or more arms) that are structured to grasp an object (e.g., between the arms, etc.) in which the grasping mechanism is resiliently coupled to the boom by a resilient coupling. For example, the boom typically moves vertically and horizontally, and optionally further extends and retracts. In addition, the gripper apparatus includes a controller operably connected to at least the grasping mechanism, which controller controls movement of the grasping mechanism. Typically, the controller is operably connected to the robot and further controls movement of the robot. In some embodiments, the resilient coupling (e.g., a sliding interface or the like) between the grasping mechanism and the boom comprises at least one spring, which spring resiliently couples the grasping mechanism to the boom. Typically, at least one, and often each, arm further includes a stop. In these embodiments, the controller generally includes a logic device having one or more logic instructions that direct the gripper apparatus to contact the object such that the object is pushed against a push surface by the stop, whereby the resilient coupling allows the arms to reversibly recede from an initial position, and grasp at least a section of the object with the arms, after which the arms advance at least substantially back to the initial position. Additionally, the logic instructions typically further direct the gripper apparatus to remove the object from a first position and place the object at a second position. In addition, at least a portion of the grasping mechanism generally includes a polished or coated surface (e.g., coated with TEFLON® or the like) that reduces friction between the object and the grasping mechanism relative to an unpolished or non-coated surface when the object is grasped by the arms. Friction is also optionally reduced by incorporating rollers into grasping mechanism surfaces that contact objects.

In some embodiments, one or more of the arms comprise at least one support surface and at least one height adjusting surface. In these embodiments, each support surface is optionally disposed between two height adjusting surfaces, which height adjusting surfaces are angled to push the object into contact with the support surface when the object is grasped. Optionally, the support surface comprises a substantially horizontal surface to support the object and the height adjusting surface comprises an angled surface that intersects with the substantially horizontal surface, which angled surface pushes the object into contact with the substantially horizontal surface when the arms grasp the object. In certain embodiments, one or more of the arms comprise a pivot member, which pivot member comprises the support surface and the height adjusting surface. In these embodiments, the pivot member is optionally resiliently coupled to the arms. In addition, the gripper apparatus optionally further comprises a deflectable member (e.g., a breakaway or the like) that defectively couples the grasping mechanism to the boom, which deflectable member deflects when the grasping mechanism contacts an item with a force greater than a preset force.

The invention also provides other grasping mechanism embodiments. In one aspect, for example, the invention relates to a grasping mechanism that includes movably coupled arms that are structured to grasp an object in which at least one arm includes at least one support surface to support the object and at least one height adjusting surface that pushes the object into contact with the support surface when the arms grasp the object. In certain embodiments, for example, each support surface is disposed between two height adjusting surfaces, which height adjusting surfaces are angled to push the object into contact with the support surface when the object is grasped. In another aspect, the invention provides a grasping mechanism that includes movably coupled arms that are structured to grasp an object in which at least one arm includes a pivot member (e.g., a resiliently coupled pivot member) that aligns with the object when the arms grasp the object. In still another aspect, the invention relates to a grasping mechanism that includes movably coupled arms that are structured to grasp an object in which at least one arm includes a stop that determines a y-axis position of the object.

In another aspect, the invention provides a grasping mechanism that includes movably coupled arms (e.g., two movably coupled arms, etc.) that are structured to grasp an object in which at least one arm comprises a pivot member that aligns with the object when the arms grasp the object (e.g., between the arms, etc.). In some embodiments, the pivot member is resiliently coupled to the arm. Typically, each arm comprises the pivot member.

The grasping mechanism is typically also movably connected to a boom, which boom is movably connected to a base. The boom and the base generally comprise a robot. In addition, the grasping mechanism typically further includes a controller coupled to the grasping mechanism, which controller controls movement of the grasping mechanism. The controller also typically further controls movement of the boom. Optionally, the grasping mechanism further comprises at least one sensor that communicates with the controller to determine a location of the grasping mechanism relative to the object. The boom generally moves vertically and horizontally, and optionally extends and retracts. In some embodiments, the grasping mechanism further includes a deflectable member that defectively couples the grasping mechanism to the boom, which deflectable member (e.g., a breakaway, etc.) deflects when the grasping mechanism contacts an item with a force greater than a preset force. In certain embodiments, the grasping mechanism further includes at least one push surface and one or more of the arms further comprise a stop that determines a y-axis position of the object when the grasping mechanism pushes the object against the push surface. In these embodiments the y-axis position of the object is generally determined with an accuracy to within about 0.1 millimeters.

In other aspects, the invention provides a gripper apparatus that includes a grasping mechanism comprising movably coupled arms that are structured to grasp an object. At least one arm includes a stop and a pivot member having: a) a support surface to support the object, and b) a height adjusting surface that pushes the object into contact with the support surface such that when the arms grasp the object the support surface and the height adjusting surface determine at least a z-axis position of the object. The gripper apparatus also includes a deflectable member that defectively couples the grasping mechanism to a boom and a controller coupled to the grasping mechanism, which controller controls movement of the grasping mechanism. In addition, the gripper apparatus also includes at least one push surface against which the gripper apparatus pushes the object into contact with the stop to determine a y-axis position of the object.

In still another aspect, the invention relates to various methods. For example, the invention provides methods that include providing a gripper apparatus that includes a controller coupled grasping mechanism structured to grasp an object with arms (e.g., two arms, etc.) that extend from a body of the grasping mechanism in which at least one arm includes a stop. Further, at least two grasping mechanism components are resiliently coupled together (e.g., along a y-axis direction, etc.). To illustrate, in certain embodiments, the arms are resiliently coupled to the body of the grasping mechanism. Optionally, pivot members and/or stops are resiliently coupled to the arms. The methods also include pushing the object against a push surface and into contact with the stop, whereby the resilient coupling allows the arms to reversibly recede from an initial position (e.g., an initial y-axis position, etc.), and grasping at least a section of the object with the arms, after which the arms advance at least substantially back to the initial position, thereby grasping the object. Although other configurations are optionally utilized, the grasping mechanism is generally structured to grasp the object (e.g., a plate, a sample plate, a micro-well plate, a reaction block, a reaction block carrier, a sample holder, a petri dish, a test tube, a vial, a crucible, a reaction vessel, a reaction flask, a semi conductor wafer, a CD, a tray, or the like) between the arms. The object is typically positioned at a first position and the method generally further includes removing the object from the first position with the gripper apparatus and placing the object at a second position with the gripper apparatus.

In preferred embodiments, one or more arms include at least one support surface and at least one height adjusting surface. The support surface and the height adjusting surface typically form a channel to grasp the object. In particular, the support surface generally includes a substantially horizontal surface that supports the object and the height adjusting surface generally includes an angled surface that pushes the object into contact with the substantially horizontal surface during the grasping step. To illustrate, the methods typically determine three translational axis positions of the object with an accuracy to within about 0.1 millimeters. In addition, the one or more arms typically include a pivot member (e.g., a resiliently coupled pivot member), which pivot member includes the support surface and the height adjusting surface. The grasping mechanism is generally movably connected to a boom, which boom is movably connected to a base. The boom and the base typically include a robot. Further, the boom generally moves vertically and horizontally, and optionally, extends and retracts. In addition, the boom generally rotates about 360 degrees. The gripper apparatus also optionally includes a deflectable member (e.g., a breakaway, etc.) that deflectively couples the grasping mechanism to the boom and the methods further include deflecting the deflectable member when the grasping mechanism contacts the object or another item with a force greater than a preset force.

The invention also provides a method of determining an x-axis position and a z-axis position of an object. The method includes providing a gripper apparatus that includes a controller coupled grasping mechanism including movably coupled arms that are structured to grasp an object in which at least one arm includes a support surface and a height adjusting surface. The method also includes grasping at least a section of the object with the arms such that the height adjusting surface pushes the object into contact with the support surface, thereby determining the x-axis position and the z-axis position of the object. In some embodiments, one or more of the arms include a stop and the method further includes providing at least one push surface, and pushing the object against the at least one push surface and into contact with the stop using the gripper apparatus, thereby determining a y-axis position of the object. Typically, the object is positioned at an initial position and the method generally further includes removing the object from the initial position with the gripper apparatus and placing the object at a new position with the gripper apparatus.

In addition, the invention relates to a method of grasping an object that includes providing a gripper apparatus that includes a controller coupled grasping mechanism including movably coupled arms that are structured to grasp the object in which at least one arm includes a pivot member. The method also includes grasping at least a section of the object such that the pivot member aligns with the object, thereby grasping the object. In some embodiments, one or more of the arms include a stop and the method further includes providing at least one push surface, and pushing the object against the at least one push surface and into contact with the stop using the gripper apparatus, thereby determining a y-axis position of the object. Typically, the object is positioned at an initial position and the method further includes removing the object from the initial position with the gripper apparatus and placing the object at a new position with the gripper apparatus.

The invention additionally relates to a method of determining a y-axis position of an object. The method includes providing a gripper apparatus that includes a controller coupled grasping mechanism having movably coupled arms that are structured to grasp the object in which at least one arm comprises a stop, and providing at least one push surface. The method also includes grasping at least a section of the object with the arms, and pushing the object against the at least one push surface and into contact with the stop using the gripper apparatus, thereby determining the y-axis position of an object. Typically, the object is positioned at an initial position and the method further includes removing the object from the initial position with the gripper apparatus and placing the object at a new position with the gripper apparatus.

The invention also relates to a method of grasping an object that includes providing a gripper apparatus that includes a controller coupled grasping mechanism having movably coupled arms that are structured to grasp the object and a deflectable member that defectively couples the grasping mechanism to a boom. The method also includes grasping at least a section of the object with the arms such that the deflectable member deflects when the grasping mechanism contacts the object or another item with a force greater than a preset force.

The invention further provides a method of determining three translational axis positions of an object. The method includes providing a gripper apparatus that includes a controller coupled grasping mechanism including movably coupled arms that are structured to grasp an object. At least one arm includes a pivot member having a support surface and a height adjusting surface in which one or more of the arms include a stop. Further, a deflectable member defectively couples the grasping mechanism to a boom. The method also includes providing at least one push surface. In addition, the method includes grasping at least a section of the object with the arms such that the height adjusting surface pushes the object into contact with the support surface to determine the x-axis position and the z-axis position of the object. Furthermore, the method includes pushing the object against the at least one push surface and into contact with the stop, using the gripper apparatus, to determine a y-axis position of the object, thereby determining the three translational axis positions of the object.

The invention also provides a method of grasping an object that includes providing a gripper apparatus that comprises a controller coupled grasping mechanism having movably coupled arms that are structured to grasp an object. At least one arm comprises a stop, and at least two grasping mechanism components are resiliently coupled to each other by a resilient coupling. The method also includes contacting the object such that the object is pushed against a push surface by the stop, whereby the resilient coupling allows the arms to reversibly recede from an initial position. In addition, the method includes grasping at least a section of the object with the arms, after which the arms advance at least substantially back to the initial position. The method also generally further includes removing the object from a first position and placing the object at a second position.

BRIEF DESCRIPTION OF THE DRAWINGS

The nature, goals, and advantages of the invention will become more apparent to those skilled in the art after considering the following detailed description when read in connection with the accompanying drawings in which like reference numerals identify like components throughout the drawings, unless the context indicates otherwise. It will be understood that some or all of the figures may be schematic representations for purposes of illustration and do not necessarily depict the actual relative sizes or locations of the elements shown.

FIGS. 6A and B schematically show relative orientations of pivot members and a sample plate as a gripper apparatus grasps the sample plate according to one embodiment of the invention.

FIG. 13A schematically illustrates the approach from a top view, whereas FIG. 13B schematically illustrates the approach from a perspective view.

FIGS. 14A and B schematically illustrate the stops of the grasping mechanism of FIG. 13 in contact with a sample plate according to one embodiment of a grasping method of the invention. FIG. 14A schematically illustrates the contact from a top view, whereas FIG. 14B schematically illustrates the contact from a perspective view.

FIGS. 15A and B schematically illustrate the arms of the grasping mechanism of FIG. 13 grasping a sample plate according to one embodiment of a grasping method of the invention. FIG. 15A schematically illustrates the grasp from a top view, whereas FIG. 15B schematically illustrates the grasp from a perspective view.

FIG. 16 schematically shows relative orientations of pivot members, stops, and a sample plate as a gripper apparatus grasps the sample plate according to one embodiment of the invention.

FIGS. 17A and B schematically illustrate the grasping mechanism of FIG. 13 removing a sample plate from a station shelf according to one embodiment of a grasping method of the invention. FIG. 17A schematically illustrates the removal from a top view, whereas FIG. 17B schematically illustrates the removal from a perspective view.

DETAILED DISCUSSION OF THE INVENTION

I. Definitions

Figure 1:
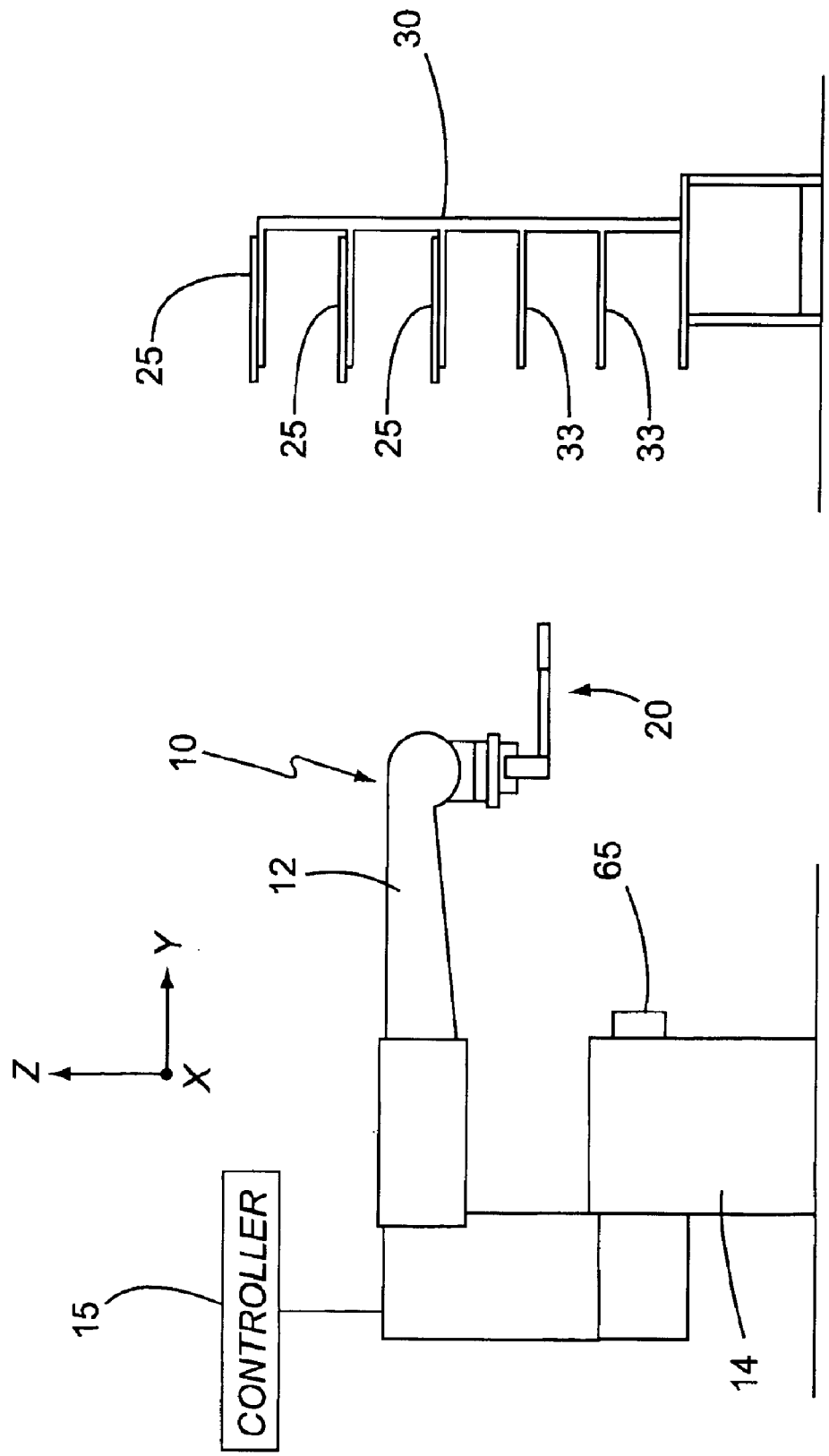
FIG. 1 schematically depicts one embodiment of a gripper apparatus from a side elevational view.

Before describing the present invention in detail, it is to be understood that this invention is not limited to particular devices or systems, which can, of course, vary. It is also to be understood that the terminology used herein is for the purpose of describing particular embodiments only, and is not intended to be limiting. Further, unless defined otherwise, all technical and scientific terms used herein have the same meaning as commonly understood by one of ordinary skill in the art to which the invention pertains. In describing and claiming the present invention, the following terminology will be used in accordance with the definitions set out below.

The term "vertical" refers to a plane that is approximately perpendicular a plane of a horizontal or supporting surface.

The term "horizontal" refers to a plane that is approximately parallel to a plane of a supporting surface and approximately perpendicular a vertical plane.

The "x-axis" refers to an axis in a three-dimensional rectangular coordinate system that is substantially parallel to a horizontal plane and approximately perpendicular to both the y- and z-axes.

The "y-axis" refers to an axis in a three-dimensional rectangular coordinate system that is substantially parallel to a horizontal plane and approximately perpendicular to both the x- and z-axes.

The "z-axis" refers to an axis in a three-dimensional rectangular coordinate system that is substantially parallel to a vertical plane and approximately perpendicular to both the x- and y-axes.

II. Gripping Devices

The present invention provides gripper apparatus and grasping mechanisms that grasp and manipulate objects with greater accuracy and throughput than preexisting technologies. For example, unlike the devices of the invention, conventional robotic systems generally achieve an object positioning accuracy or geometric tolerance of at most about 1 mm. Although such a tolerance is adequate, e.g., for processing some lower density sample plates, such a tolerance is inadequate for higher density plates, such as a plate with 1536 or more wells. Indeed, a positioning error of 1 mm for a 1536-well sample plate could cause a sample or reagent to be deposited entirely in a non-specified well and/or cause damage to the apparatus. The apparatus of the invention also grasp objects stronger and more securely than preexisting devices and as a consequence, grasping processes can be performed more rapidly, which leads to improved throughput.

In addition, preexisting robotic grippers typically rely on friction to control the object in all six degrees of freedom, which include three translational and three rotational degrees of freedom. In contrast, in certain embodiments of the invention, gripper apparatus positively locate or position work pieces or other objects in five degrees of freedom (two translational and three rotational). The remaining translational degree of freedom, which typically corresponds to the y-axis, is generally positively determined or stopped in one direction by a stop or backstop component and controlled by friction in the opposite direction. This approach is also generally preferred to positively locating an object in all six degrees of freedom, which would involve surrounding a given object, e.g., with a grasping mechanism or assembly. A better engineering compromise provided by certain aspects of the present invention is to grasp only one end of a given work piece, which provides for smaller and stiffer grasping mechanisms than is provided by preexisting technologies. Smaller grasping mechanisms are also able to access objects in more constrained locations than many preexisting devices are capable. To overcome the friction control in the one y-axis direction, certain embodiments include pushing an object against solid wall or other push surface after it has been picked up. This slides the object in the one frictionally controlled direction until it contacts a backstop on the gripper mechanism. At that point, the position of the object is accurately located or determined in all six degrees of freedom. In other embodiments, the object is contacted with the gripper mechanism stops, e.g., prior to grasping or otherwise contacting the object with other gripper mechanism components, such as gripper mechanism arms. These embodiments also accurately determine the position of the object in all six degrees of freedom.

FIG. 1 schematically depicts one embodiment of gripper apparatus 10 from a side elevational view. Robotic gripper apparatus 10 is an automated robotic device, e.g., for accurately and securely grasping, moving, manipulating and/or positioning objects. The design of robotic gripper apparatus 10 is optionally varied to accommodate different types of objects. One preferred embodiment of robotic gripper apparatus 10 is manufactured to grasp sample plates (e.g., microwell plates or the like). Other exemplary objects include, e.g., reaction blocks, reaction block carriers, petri dishes, test tubes, vials, crucibles, reaction vessels or flasks, hazardous material containers, medical devices or components, electronic devices or components, semi conductor wafers, CDs, trays, etc. Reaction blocks and reaction block carriers are described in greater detail in, e.g., U.S. Ser. No. 09/947,236, entitled "PARALLEL REACTION DEVICES," filed Sep. 5, 2001 by Micklash et al., and U.S. Ser. No. 60/351,821, entitled "DEVICES, SYSTEMS, AND METHODS OF MANIFOLDING MATERIALS," filed Jan. 25, 2002 by Micklash et al., the disclosures of which are incorporated by reference in their entirety for all purposes.

In a preferred embodiment illustrated in FIG. 1, robotic gripper apparatus 10 includes grasping mechanism 20 movably connected to boom 12, which is movable relative to base 14. Controller 15, which optionally includes a general purpose computing device, controls the movements of, e.g., grasping mechanism 20 and boom 12 in a work perimeter that includes one or more stations 30 that can receive and support sample plates 25. Controllers are described further below. As shown, grasping mechanism 20 is designed to grasp sample plates 25 and move them, e.g., from one station 30 to another station 30 or to other locations within the work perimeter of robotic gripper apparatus 10. Although FIG. 1 illustrates only a single work perimeter, more work perimeters, e.g., each including a gripper apparatus, are optionally utilized, depending upon the specific application. Additional details relating to robotic gripping devices are provided in, e.g., U.S. Pat. No. 5,871,248, entitled "ROBOT GRIPPER," which issued Feb. 16, 1999 to Okogbaa et al. and U.S. Pat. No. 5,945,798, entitled "SYSTEM FOR DETERMINING PART PRESENCE AND GRIP PRESSURE FOR A ROBOTIC GRIPPING DEVICE," which issued Aug. 31, 1999 to Stagnitto et al.

The controllers of the present invention typically include at least one computer (or other information appliance) operably connected to or included within various apparatus or system components (e.g., grasping mechanisms, booms, etc.). The computer typically includes system software or logic instructions that direct, e.g., the movement of robotic booms, the movement of grasping mechanism arms, and/or the movement of other gripper apparatus components. Additionally, a gripper apparatus is optionally coupled to an appropriately programmed processor or computer which functions to instruct the operation of device instrumentation or components in accordance with preprogrammed or user input instructions, receive data and information from these instruments, and interpret, manipulate and report this information to the user. As such, the computer is typically appropriately coupled to one or more of these instruments (e.g., including an analog to digital or digital to analog converter as needed).

In certain embodiments, Microsoft WINDOWS™ software written using instrument control language (ICL) scripts is adapted for use in the gripper apparatus and systems of the invention. Optionally, standard desktop applications such as word processing software (e.g., Microsoft Word™ or Corel WordPerfect™) and database software (e.g., spreadsheet software such as Microsoft Excel™, Corel Quattro Pro™, or database programs such as Microsoft Access™ or Paradox™) can be adapted to the present invention by inputting user-defined instructions, such as defining work piece locations, preset forces for breakaways, or the like. For example, the systems optionally include the foregoing software having the appropriate, e.g., work piece positional information used in conjunction with a user interface (e.g., a GUI in a standard operating system such as a Windows, Macintosh or LINUX system) to manipulate such information.

The computer can be, e.g., a PC (Intel x86 or Pentium chip-compatible DOS™, OS2™, WINDOWS™, WINDOWS NT™, WINDOWS95™, WINDOWS98™, WINDOWS2000™, WINDOWSXP™, LINUX-based machine, a MACINTOSH™, Power PC, or a UNIX-based (e.g., SUN™ work station) machine or other common commercially available computer which is known to one of skill. Software for performing, e.g., object grasping, object translocation, or the like is optionally easily constructed by one of skill using a standard programming language such as Visual basic, Fortran, Basic, Java, or the like. Any controller or computer optionally includes a monitor which is often a cathode ray tube ("CRT") display, a flat panel display (e.g., active matrix liquid crystal display, liquid crystal display, etc.), or others. Computer circuitry is often placed in a box (e.g., within the base of the gripper apparatus of the invention), which includes numerous integrated circuit chips, such as a microprocessor, memory, interface circuits, and others. The box also optionally includes a hard disk drive, a floppy disk drive, a high capacity removable drive such as a writeable CD-ROM, and other common peripheral elements. Inputting devices such as a keyboard (e.g., a touch screen, etc.) or mouse optionally provide for input from a user.

The computer typically includes appropriate software for receiving user instructions, either in the form of user input into a set of parameter fields, e.g., in a GUI, or in the form of preprogrammed instructions, e.g., preprogrammed for a variety of different specific operations. The software then converts these instructions to appropriate language for instructing the grasping mechanism, the boom, or the like to carry out the desired operation, e.g., varying or selecting the rate or mode of movement of various system components, or the like. The computer then receives the data from the one or more sensors/detectors included within the apparatus or system, and interprets the data, either provides it in a user understood format, or uses that data to initiate further controller instructions, in accordance with the programming, e.g., such as in monitoring boom location, grasping mechanism location, or the like.

Referring again to FIG. 1, boom 12 is generally capable of about 360 degrees of rotation. In addition, boom 12 typically moves vertically and horizontally, e.g., to align grasping mechanism 20 with higher or lower stations 30. Although many types of robots can be used in robotic gripper apparatus 10, in a preferred embodiment of the invention, a Stäubli RX-60 robot (provided by Stäubli Corporation of South Carolina, U.S.A.), which includes boom 12 and base 14, is utilized.

Boom 12 is configured to extend and retract from base 14. This defines the work perimeter for robotic gripper apparatus 10. Stations 30 are positioned within the work perimeter of boom 12 as are hand-off areas or other areas that are configured to support or receive objects grasped and moved by grasping mechanism 20. For example, sample plate 25 is positioned on station shelf 33 and can be grasped by grasping mechanism 20 and moved to another position by boom 12. As mentioned above, in preferred embodiments, sample plate 25 includes multiple wells, with each well configured to hold a sample. For example, sample plate 25 optionally includes, e.g., 6, 12, 24, 48, 96, 192, 384, 768, 1536, or another number of wells.

Figure 2:
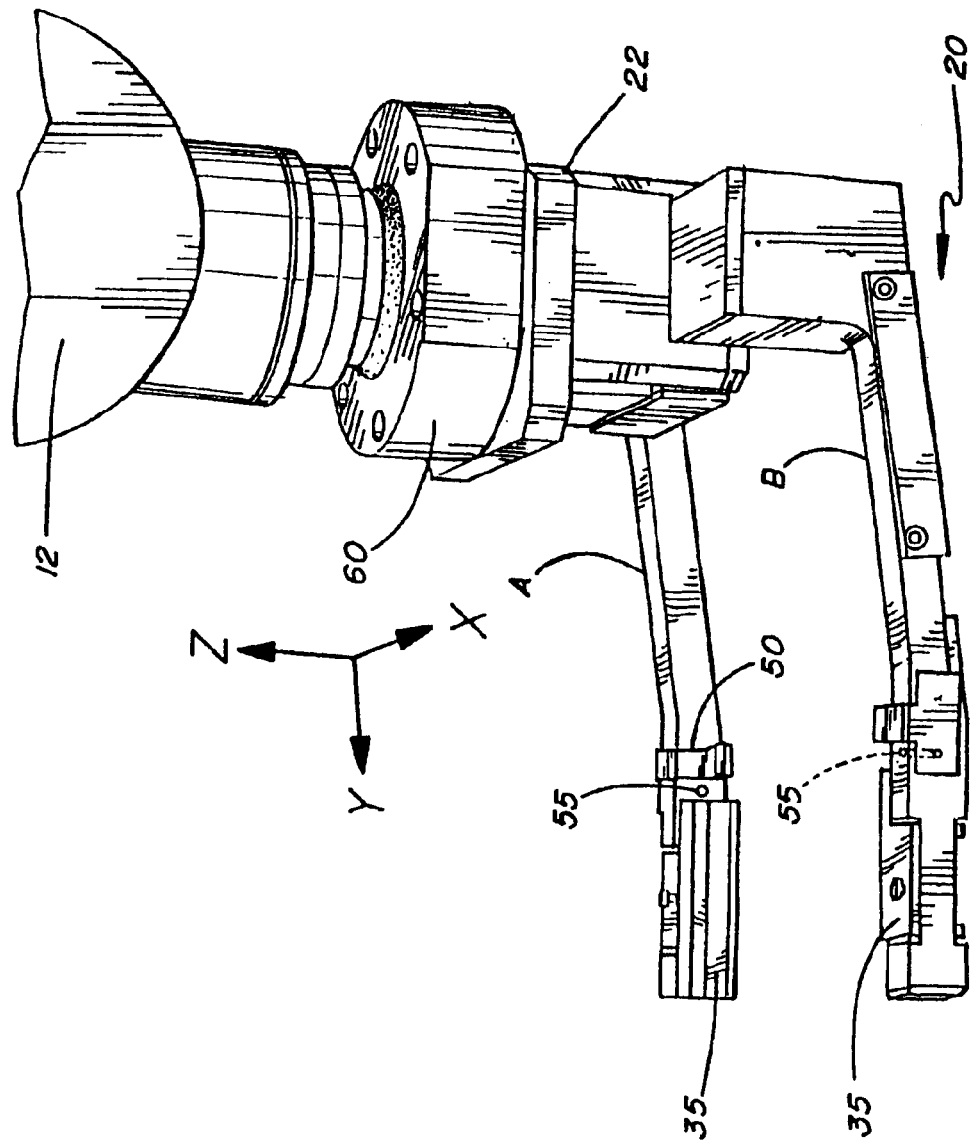
FIG. 2 schematically illustrates one embodiment of a grasping mechanism coupled to a boom of a robot from a perspective view.
Figure 3:
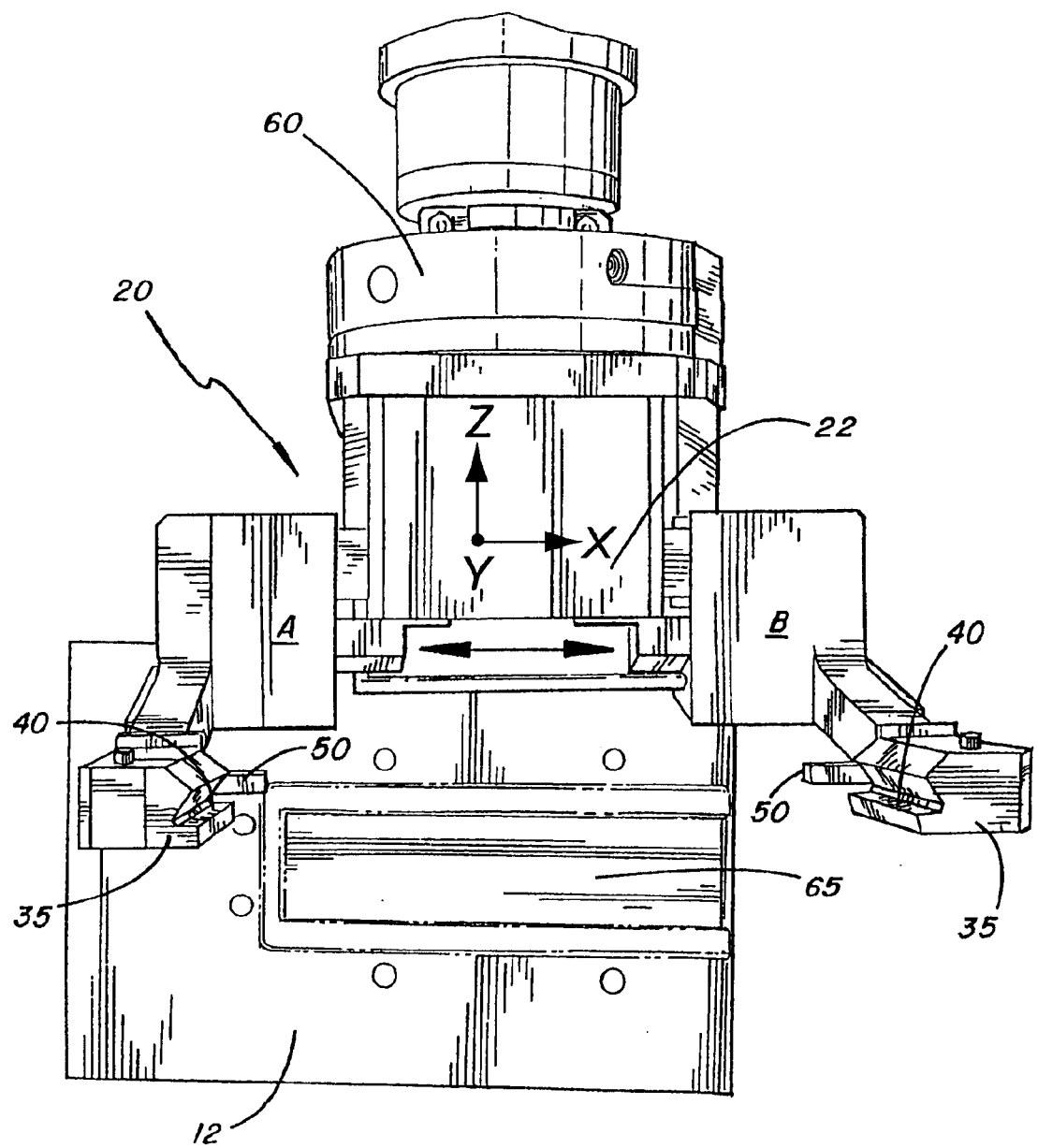
FIG. 3 schematically shows a front elevational view of the grasping mechanism of FIG. 2.

Referring now to FIGS. 2 and 3, one embodiment of grasping mechanism 20 is illustrated. Grasping arm A and grasping arm B extend from gripper mechanism body 22. Although the embodiments described herein include two arms for purposes of clarity of illustration, the grasping mechanisms of the invention optionally include more than two arms, e.g., about three, about four, about five, about six, or more arms. Further, although in preferred embodiments grasping mechanism arms are structured to grasp objects between the arms, other configurations are also optionally included, e.g., such that certain objects can be at least partially, if not entirely, grasped internally, e.g., via one or more cavities disposed in one or more surfaces of the particular objects.

As further shown in FIGS. 2 and 3, grasping mechanism body 22 is connected to a deflectable member, such as breakaway 60, which is deflectably coupled to boom 12. Breakaway 60 is typically structured to detect angular, rotational, and compressive forces encountered by grasping mechanism 20. The breakaway acts as a collision protection device that greatly reduces the possibility of damage to components within the work perimeter by, e.g., the accidental impact of grasping mechanism 20 or grasping arms A and B with objects or other items (e.g., station shelves, etc.) within the work perimeter. For example, when grasping mechanism 20 impacts an object, breakaway 60 will deflect, thereby also causing grasping mechanism 20 to deflect. To further illustrate, deflectable members in the apparatus of the invention generally deflect when the grasping mechanism contacts an object or other item with a force greater than a preset force. The preset force typically includes a torque force and/or a moment force that, e.g., ranges between about 1.0 Newton-meter and about 10.0 Newton-meters. When controller 15 detects the deflection, it generally stops movement of the robotic gripper mechanism. In a preferred embodiment, breakaway 60 is a "QuickSTOP™" collision sensor manufactured by Applied Robotics of Glenville, N.Y., U.S.A. Breakaway 60 is typically a dynamically variable collision sensor that operates, e.g., on an air pressure system. Other types of impact detecting devices are optionally employed, which operate hydraulically, magnetically, or by other means known in the art. In certain embodiments, breakaways are not included in the gripper apparatus of the invention. In these embodiments, grasping mechanisms are typically directly coupled to robotic booms.

As also shown, body 22 connects grasping arms A and B to breakaway 60. When directed by controller 15, body 22 moves grasping arms A and B away from or toward each other, e.g., to grasp and release objects. In a preferred embodiment, body 22 is manufactured by Robohand of Monroe, Conn., U.S.A. Typically, the grasping arms are pneumatically driven, but other means for operating the arms are also optionally utilized, such as magnetic- and hydraulic-based systems.

Figure 4:
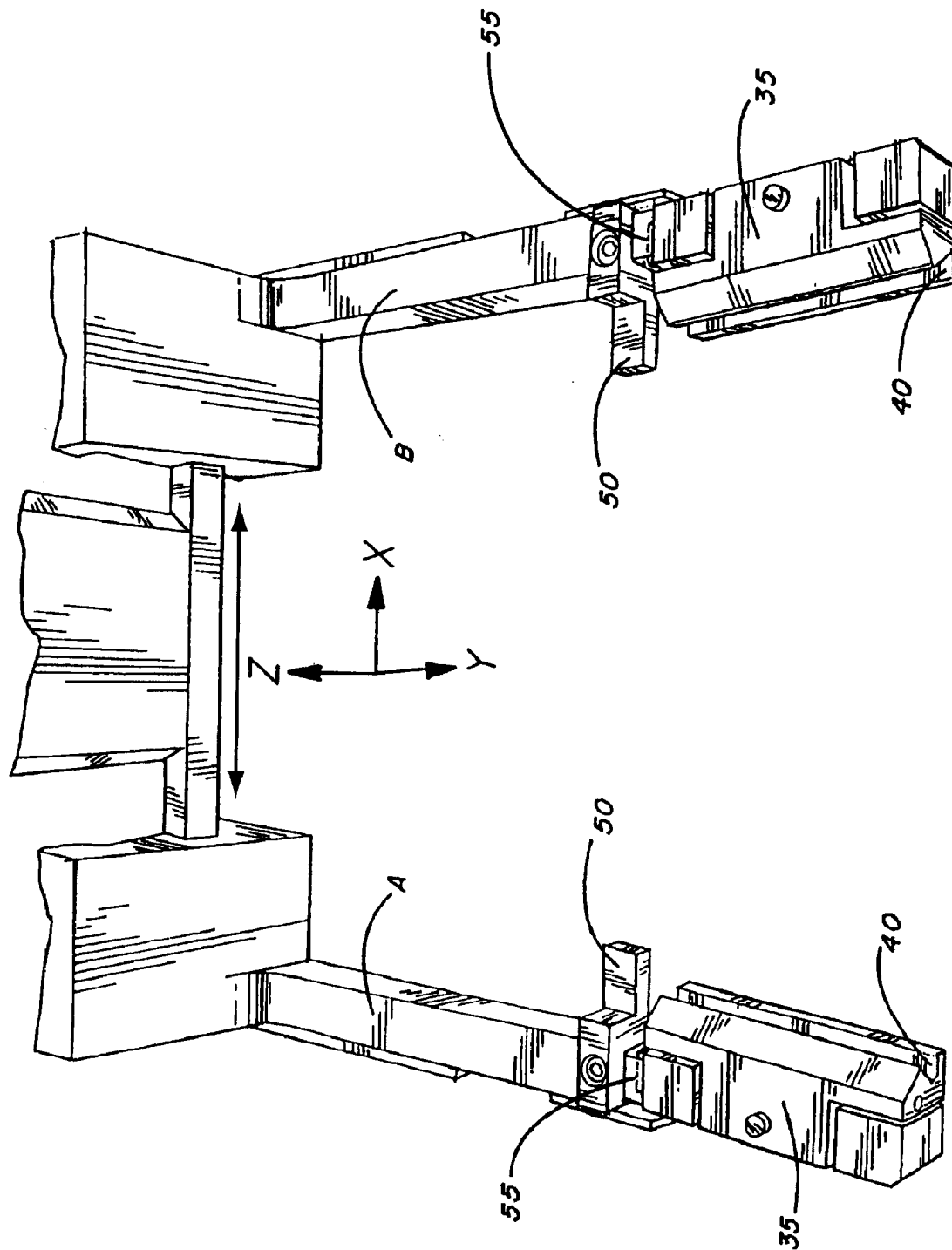
FIG. 4 schematically depicts a plan view of the grasping mechanism of FIG. 2.

Referring to FIG. 4, grasping arms A and B extend from body 22 and include gripper pads or pivot members 35, which pivotally align with objects upon contact, e.g., when grasping arms A and B are closed upon an object. As described further below, pivot members typically include support surfaces and height adjusting surfaces (e.g., that form channels to grasp objects), which determine x-axis and z-axis positions of objects when the arms grasp the objects. The support surface typically includes a substantially horizontal surface to support the object. The height adjusting surface typically includes an angled surface that intersects with the substantially horizontal surface, which angled surface pushes the object into contact with the substantially horizontal surface when the arms grasp the object. In this way, the x-axis and z-axis positions of a given object are determined with an accuracy to within about 0.1 millimeters. As described further below, grasping mechanism arms optionally do not include pivot members.

Figure 5A:
FIGS. 5A–D schematically depict various exemplary embodiments of stops.
Figure 5B:
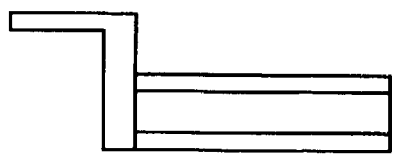
Figure 5C:
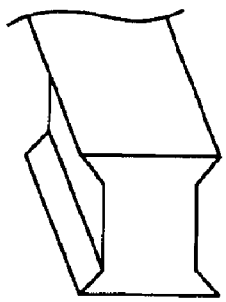
Figure 5D:
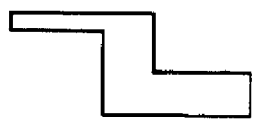
Figure 7A:
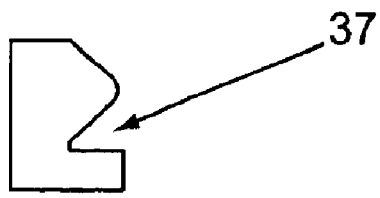
FIGS. 7A–D schematically depict cross-sectional profiles of various exemplary embodiments of pivot members.
Figure 7B:
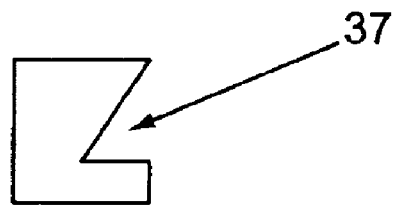
Figure 7C:
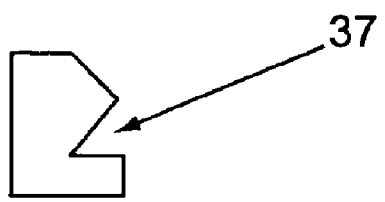
Figure 7D:
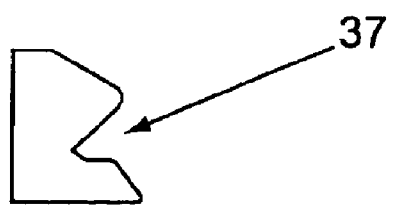

Positioned proximate to pivot members 35 are sensors 55 and stops 50. Sensors 55 communicate with controller 15 and determine the location of objects adjacent or relative to arms A and B. In a preferred embodiment, sensors 55 are optical sensors, but photoelectric, infrared, magnetic, position, laser distance, or other suitable sensors can be employed. Stops 50 are optionally included to determine y-axis positions of objects, e.g., with an accuracy to within about 0.1 millimeters. FIGS. 5A–D schematically depict profiles of certain exemplary embodiments of stops that are optionally utilized with the apparatus described herein. FIG. 5C schematically shows the stop depicted in FIG. 5B from a perspective view to further illustrate that in this embodiment, the stop includes two height adjusting surfaces (i.e., angled surfaces) which push, e.g., sample plate edges toward the center of the stop when the plate is grasped. In certain embodiments, sensors 55 and/or stops 50 are not included in the gripper apparatus.

Referring further to FIG. 4 and now also to FIGS. 6A and B with gripper pads or pivot members 35 pivotally mounted to arms A and B schematically illustrated. As shown, channel 37 extends along a long axis of each pivot member 35. Channel 37 includes substantially horizontal surface 40 and angled surface 45. To further illustrate, FIGS. 7A–D schematically depict cross-sectional profiles of various exemplary pivot member embodiments that are optionally used in the devices described herein with channel 37 indicated. In a preferred embodiment, pivot members 35 are separate device components that are pivotally mounted to arms A and B. One alternative embodiment of robotic gripper apparatus 10 includes channel 37 fabricated into arms A and B, i.e., not into separate pivot members. In these embodiments, arms A and B optionally pivot with respect to body 22. Grasping arms A and B, pivot members 35, and other grasping mechanism components are typically constructed from metals (e.g., aluminum, etc.), alloys, or the like, but dielectric materials, such as plastic or other types of materials, are also optionally utilized.

Figure 8:
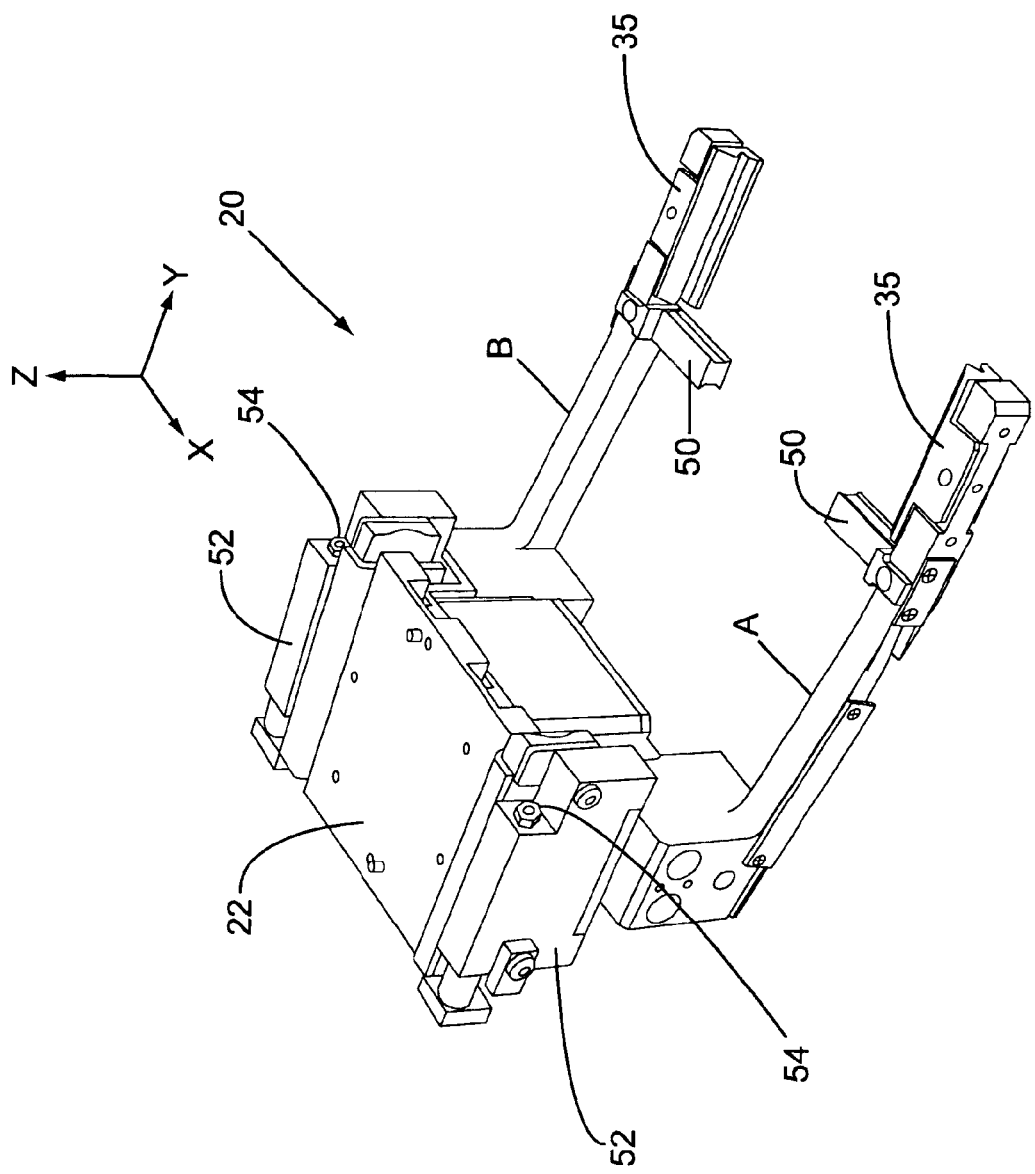
FIG. 8 schematically illustrates one embodiment of a grasping mechanism that includes arms that are resiliently coupled to a body.
Figure 9:
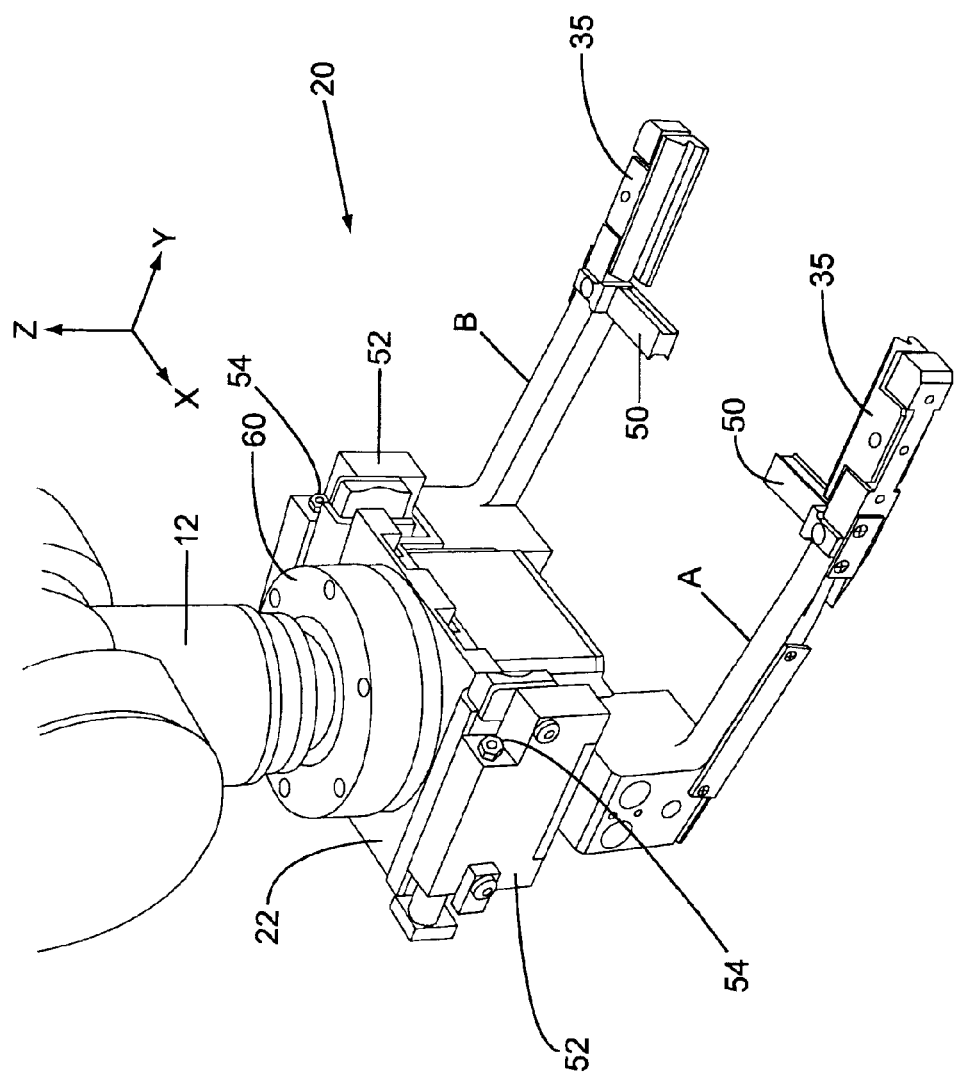
FIG. 9 schematically illustrates the grasping mechanism of FIG. 8 coupled to a boom of a robot from a perspective view.
Figure 10:
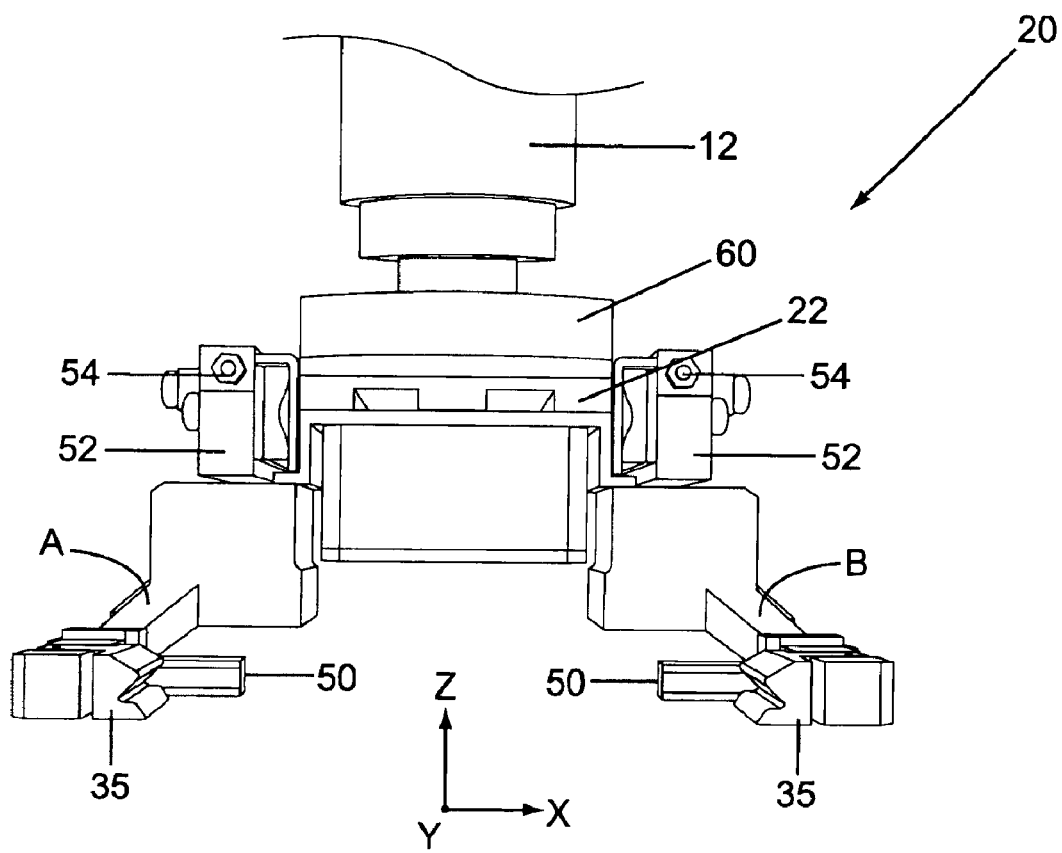
FIG. 10 schematically shows a front elevational view of the grasping mechanism of FIG. 8.

In other preferred embodiments, grasping arms are resiliently coupled to robotic booms such that when an object contacts stops on the grasping arms, the arms reversibly recede from an initial position, e.g., to determine a y-axis position of an object prior to determining the x-axis and z-axis positions of the object. Certain of these embodiments are schematically illustrated in FIGS. 8–10. In particular, FIG. 8 schematically depicts one embodiment of grasping mechanism 20 that includes arms A and B resiliently coupled to body 22 via resilient coupling or slideable interface 52. Slideable interfaces typically include springs, which resiliently couple, e.g., grasping arms to grasping mechanism bodies so that at least the grasping arms are pushed in a y-direction (e.g., a positive y-direction) opposite the movement in the y-direction (e.g., a negative y-direction) of the boom upon contacting a sample plate or other object with a force of, e.g., several pounds. Other amounts of force are also optionally utilized. The resiliency provided by the slideable interfaces of the present invention typically includes between about 0.5 mm and about 25 mm, more typically between about 1 mm and about 10 mm, and still more typically between about 1.5 mm and about 5 mm (e.g., about 2 mm, about 3 mm, or about 4 mm), of low friction compliance in the y-direction. Greater resiliency is also optionally provided by the slideable interfaces. Such resiliency is optionally provided by other interfaces that include, e.g., pneumatic mechanisms, hydraulic mechanisms, or the like. In certain embodiments, the slideable interfaces of the invention also utilize precision bearing slides with minimal friction and minimal backlash in both the x- and z-directions. As further shown, arms A and B include stops 50 and pivot members 35. As mentioned, the embodiment of grasping mechanism 20 schematically illustrated in FIG. 8 is optionally used to determine the y-axis position of an object prior to grasping the object between the arms, that is, prior to determining the x-axis and z-axis positions of the object. Methods that include grasping mechanisms such as the one schematically shown in FIG. 8 are described further below.

FIG. 9 schematically illustrates grasping mechanism 20 of FIG. 8 coupled to boom 12 of a robot from a perspective view. To further illustrate, FIG. 10 schematically shows a front elevational view of grasping mechanism 20 of FIG. 8. As shown in this embodiment, grasping mechanism 20 is connected to boom 12 via breakaway 60. Breakaways are described in greater detail above. Optionally, breakaways are not included in the gripper apparatus or systems of the invention, in which case grasping mechanisms, such as grasping mechanism 20 of FIGS. 8–10, are directly connected, e.g., to boom 12.

In preferred embodiments, at least a portion of the grasping mechanism includes a polished or coated surface (e.g., coated with TEFLON® or the like) that reduces friction between the object and the grasping mechanism relative to an unpolished or non-coated surface when the object is grasped by the arms. Friction is also optionally reduced by incorporating one or more rollers into grasping mechanism surfaces that contact objects (e.g., stops, pivot members, etc.) or by another anti-friction mechanism. In embodiments of the invention that include stops and resilient couplings or slideable interfaces, the use of such anti-friction mechanisms is important, for example, since sample plates are pushed against the stops with the force of at least the slider springs during object pick-up and drop-off processes. These processes are described in greater detail below.

III. Grasping Methods

Figure 11:
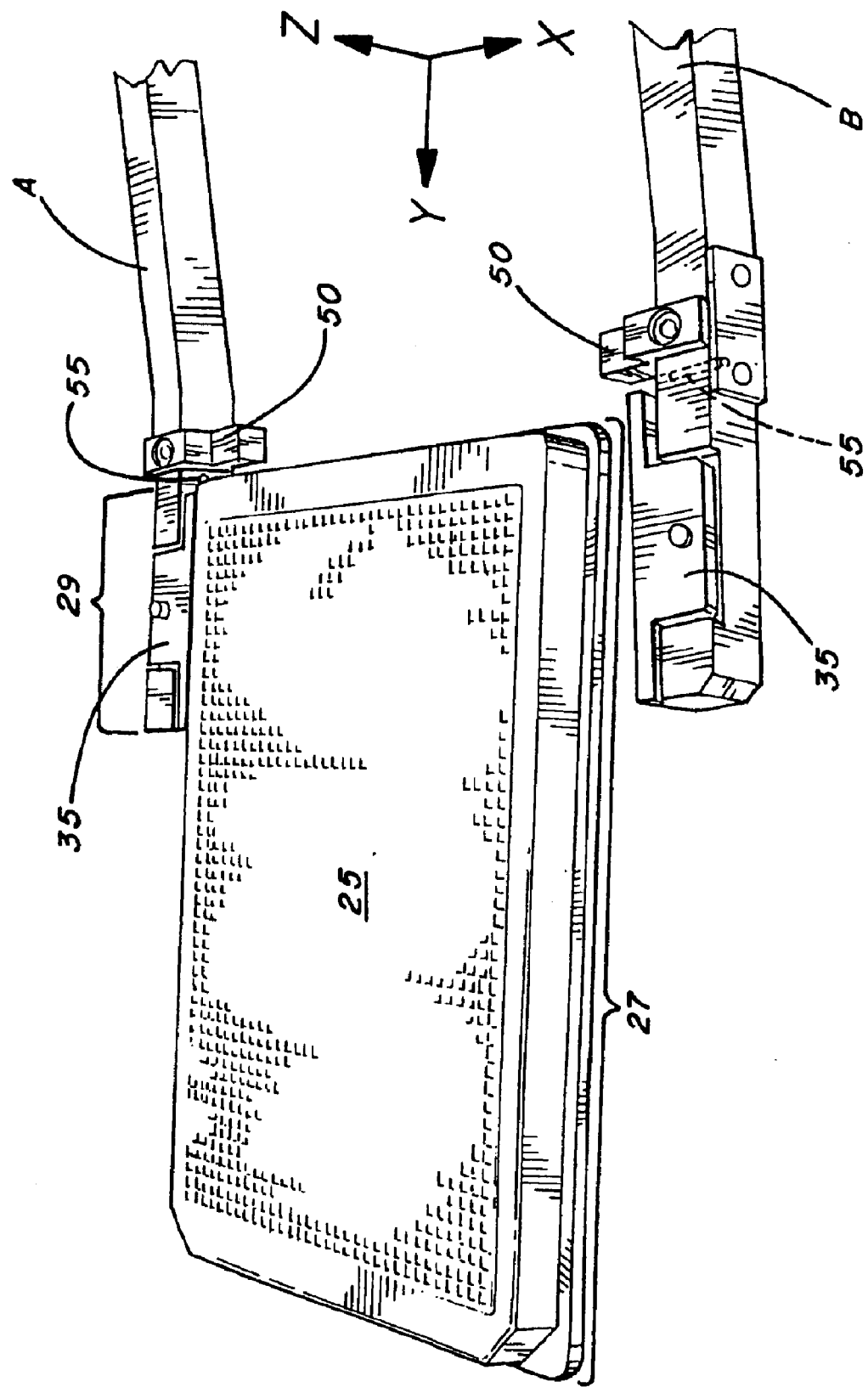
FIG. 11 schematically depicts grasping arms and a sample plate from a perspective view.
Figure 12:
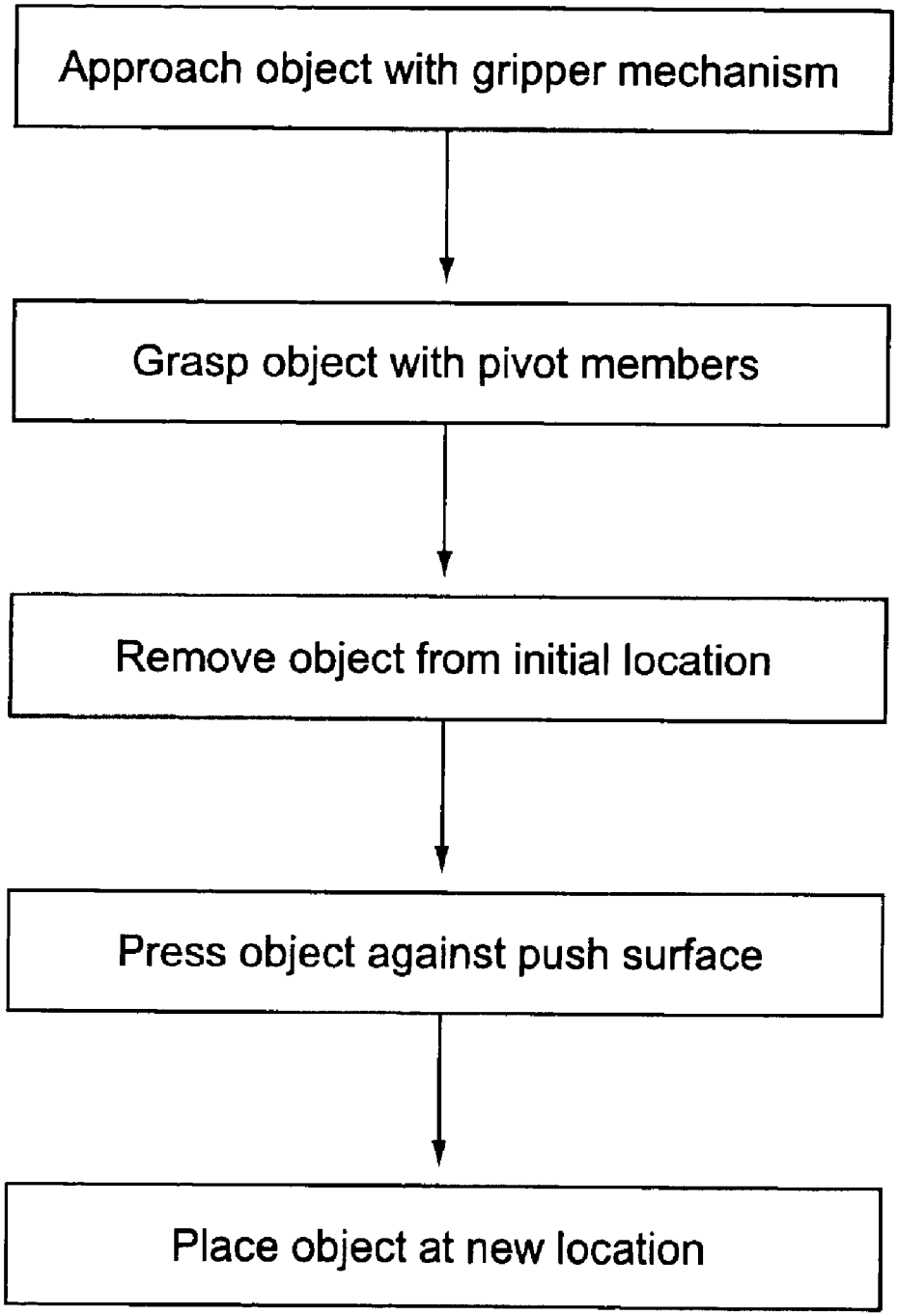
FIG. 12 is a block diagram illustrating one method of grasping an object with a gripper apparatus.
Figures 13A, 13B:
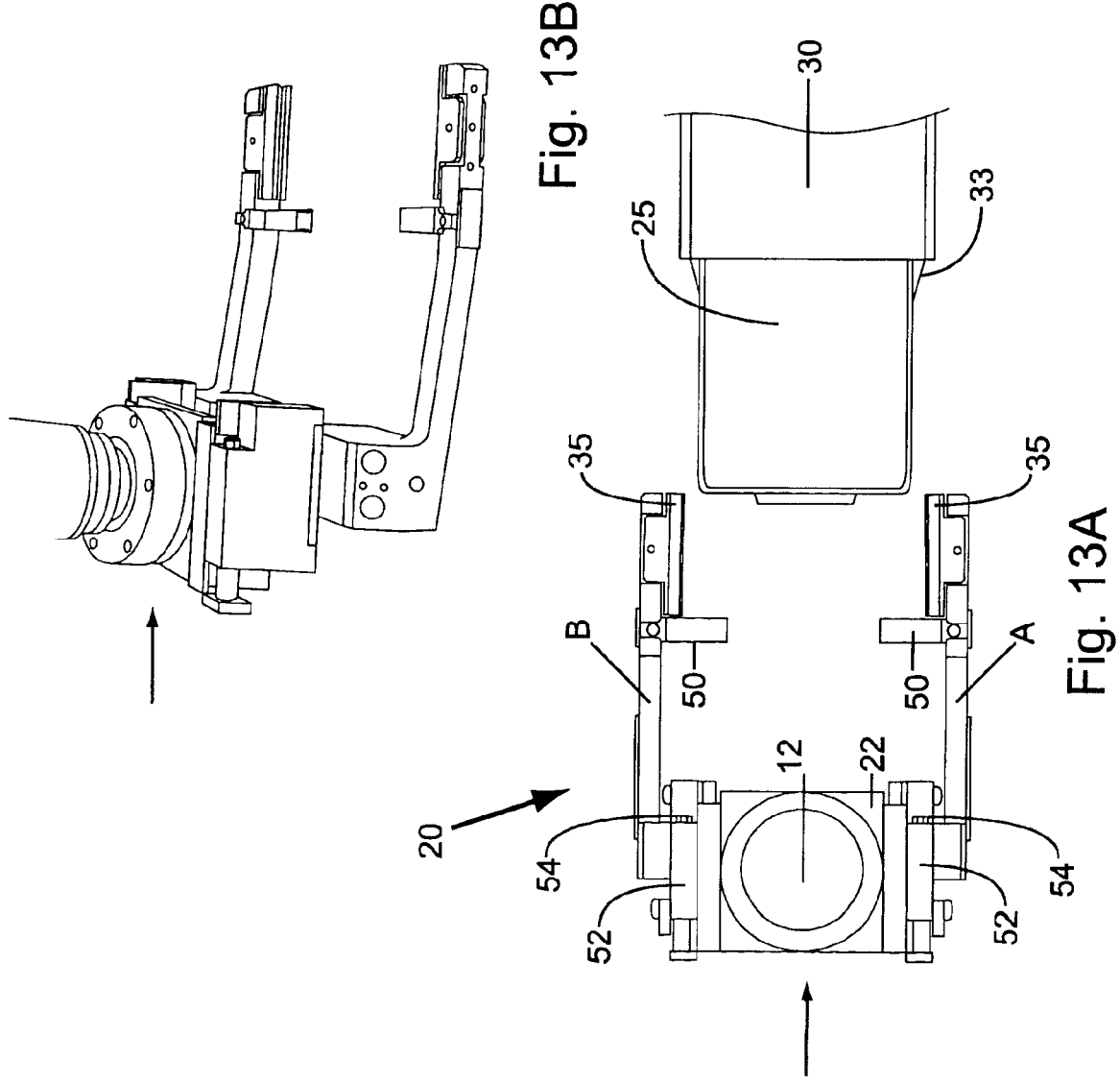
FIGS. 13A and B schematically illustrate the approach of a grasping mechanism, which is resiliently coupled to a robotic boom, to a sample plate according to one embodiment of a grasping method of the invention.

Referring again to FIGS. 1 and 6, and now also to FIGS. 11 and 12, the operation of robotic gripper apparatus 10 will now be described. In a preferred embodiment, robotic gripper apparatus 10 grips, transports and positions sample plate 25, e.g., from station 30 to another station 30, to a hand-off area, or to another location within the work perimeter of robotic gripper apparatus 10. As shown in FIG. 11, sample plate 25 includes a plurality of closely arranged sample wells. Each well in sample plate 25 is square with each side of the well having a length of about 2 millimeters. During a high throughput process, discrete fluid samples may be deposited in each well, which necessitates a positioning accuracy to within about 0.1 millimeters. The gripper apparatus of the invention are capable of achieving this positioning accuracy.

When employed in a high throughput process, controller 15 instructs robotic gripper apparatus 10 to move boom 12 toward a station 30. In a preferred embodiment, sample plates 25 are vertically arranged on station shelves 33. When instructed by controller 15, boom 12 extends grasping mechanism 20 toward a selected station 30 and between station shelves 33. Sample plates 25 are located on station shelves 33. Sensor 55 detects a station shelf 33 as grasping mechanism 20 moves closer to the selected shelf. As shown in FIG. 11, when station shelf 33 is detected, grasping arms A and B move up and contact sample plate edge 27 with pivot members 35. In the embodiment shown, sample plate 25 is substantially rectangular with at least two substantially straight sample plate edges 27. Other objects may also be grasped by grasping mechanism 20. Typically, the objects will have straight sections that can engage pivot members 35. Optionally, pivot members 35 are curved to include a curved channel 37 suitable for grasping curved objects, or otherwise shaped to accommodate the particular object to be grasped.

Referring to FIGS. 6A and B, pivot members 35 include substantially horizontal surface 40 and angle surface 45 that together form channel 37. As pivot members 35 approach sample plate 25, the vertical or z-axis position of sample plate 25 may not correspond with pivot members 35. In this case, when pivot member 35 engages sample plate edge 27, edge 27 may contact angled surface 45. As the grasping arms A and B move toward one another, pivot members 35 pivot slightly to align with and push sample plate 25 against horizontal surface 40. By including angled surface 45 on pivot members 35, the vertical position, as defined by the z-axis, is determined because angled surface 45 forces sample plate 25 to contact horizontal surface 40. This is in contrast to conventional gripping devices that do not define the vertical position of the grasped object. In addition, with conventional grasping devices, an object that is misaligned relative to the x-axes, that is, angled relative to the conventional grasping device, will be grasped at an angle, thereby only establishing a single point of contact on each side of the object.

As illustrated in FIGS. 6A and 11, the present invention includes pivot members 35 that pivot to align themselves with sample plate edge 27, thereby establishing a line of contact 29 with sample plate edge 27. By including pivot members 35 on grasping arms A and B, the present invention also establishes accurate side-to-side position, or x-axis position of sample plate 25. Grasping angled plates with the subsequent mispositioning of the angled plate is thereby eliminated.

Another step in this embodiment of positioning sample plate 25 includes removing sample plate 25 from station shelf 33. Because of the unique geometry of channels 37 located in pivot members 35, the position of sample plate 25 on the x-axis and the z-axis is determined. The y-axis or fore-and-aft position of sample plate 25, however, is not known. To determine the y-axis of sample plate 25 in this embodiment, body 22 and boom 12 of the robotic gripper apparatus 10 are moved to position sample plate 25 proximate to push surface 65.

As shown in FIGS. 1 and 3, push surface 65 is positioned in this embodiment on base 14 of robotic gripper apparatus 10. Push surface 65 can be located in other locations such as on station 30 or at other locations within the work perimeter of robotic gripper apparatus 10. Boom 12 pushes sample plate 25 against push surface 65, which pushes sample plate 25 against stops 50 located on grasping arms A and B. Push surfaces optionally include pins, walls, raised edges, or any other functionally equivalent components. Certain exemplary push surfaces 65 are schematically illustrated in, e.g., FIGS. 19 and 20. By pushing sample plate 25 against stops 50, the y-axis or fore-and-aft position of sample plate 25 is determined.

The above-described process of grasping sample plate 25 with pivot members 35 so that sample plate 25 is forced against horizontal surface 40 and then removing sample plate 25 from stations 30 and pushing sample plate 25 against push surface 65 ensures that all three translational axes of sample plate 25 are determined with an accuracy to within about 0.1 millimeters. In addition, channel 37 reduces the amount of gripping force that is typically used to grasp sample plate 25, because sample plate 25 rests on substantially horizontal surface 40. Moreover, because angled surface 45 traps sample plate 25 against horizontal surface 40 to prevent the tilting of sample plate 25, only a portion (e.g., an end section, etc.) of sample plate 25 is grasped. This allows the easy insertion of the sample plate 25 into constrained locations, because grasping arms A and B only contact a small section of sample plate 25. FIG. 12 is a block diagram that further illustrates grasping an object with a gripper apparatus.

Figure 19:
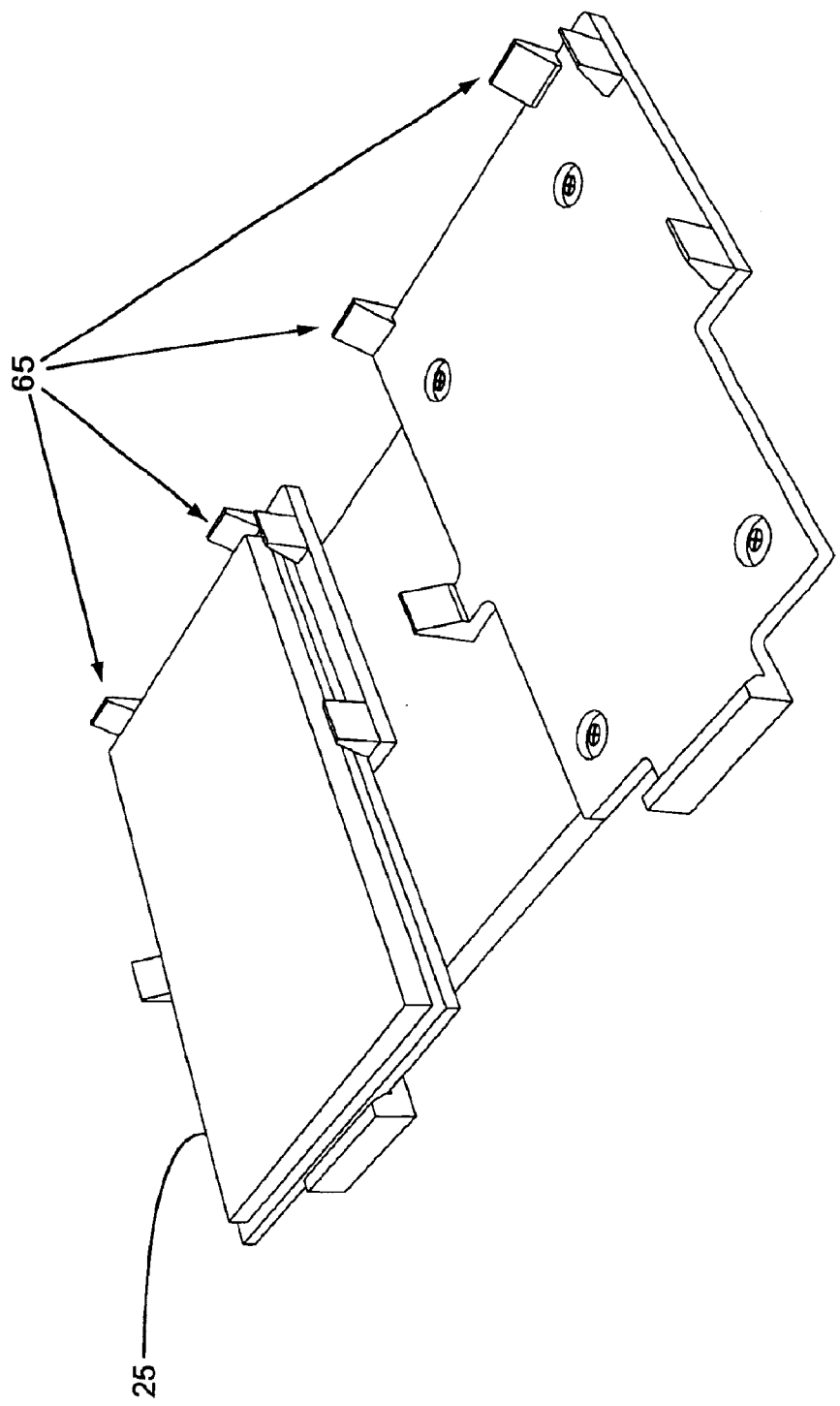
FIG. 19 schematically shows one embodiment of a push surface that can be used to locate or determine the y-axis position of an object.
Figure 20:
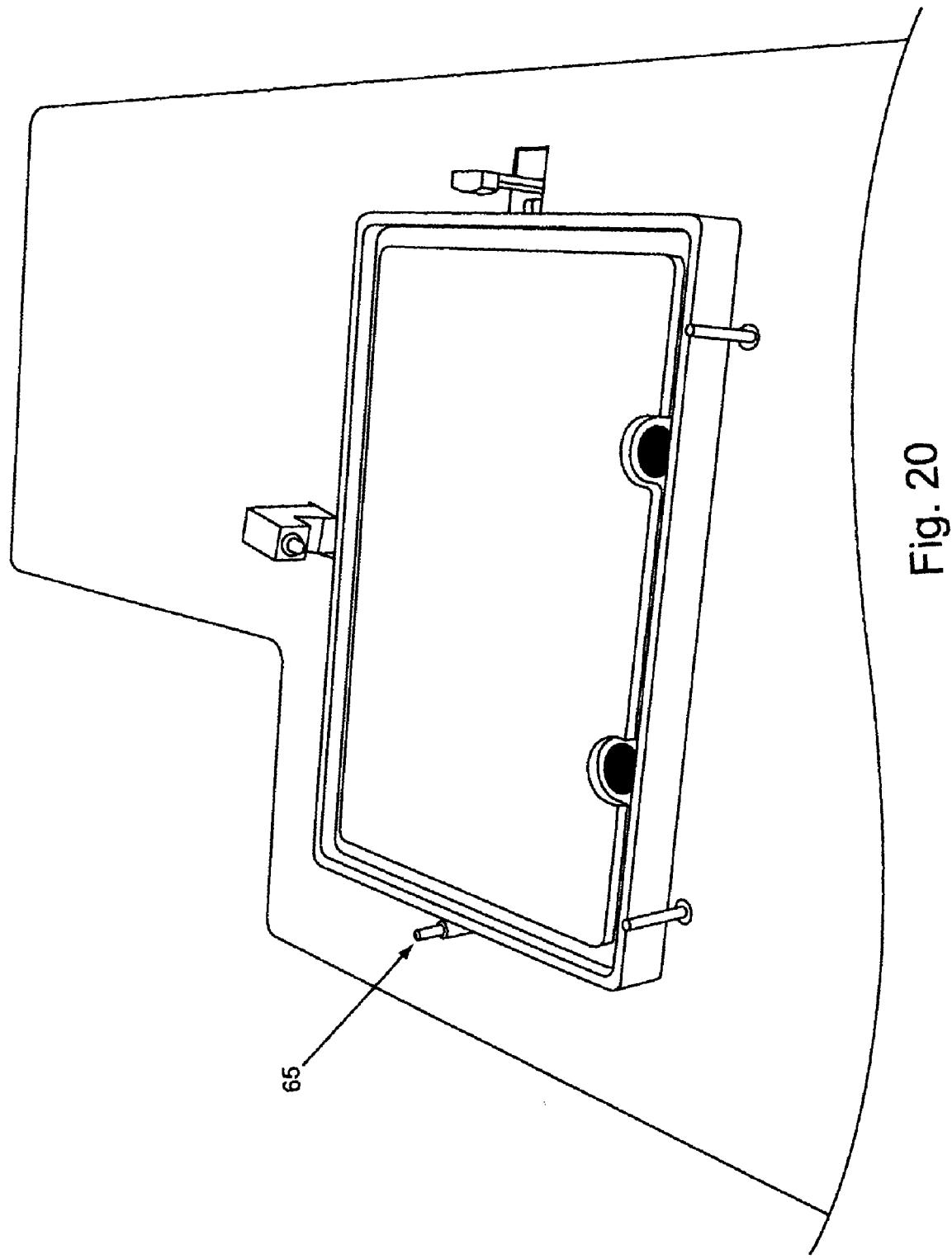
FIG. 20 schematically depicts another embodiment of a push surface that can be used to locate or determine the y-axis position of an object.

In another preferred embodiment, the present invention provides a method of dynamically and accurately locating and grasping an object that includes determining the y-axis position of the object prior to determining the z-axis and x-axis positions of the object. In certain cases, for example, variations in friction between grasping arms and the object being grasped can cause variations in the amount of force used to positively push the object back against stops on grasping arms. If the friction force is too low, the object may move out of position, e.g., due to inertial forces after the object is pushed back. If friction is too high, the object may not push back all the way to the stops and/or, if a breakaway is included in the apparatus, it may breakaway if the force exceeds a pre-selected force causing unnecessary stoppage. Accordingly, one option is to push the object back to the stops while the grasping arms are open and the frictional force is zero at the arm-object interfaces. One way to accomplish this is to provide a resilient or otherwise compliant push surface at every nest or other location from which the robotic gripper apparatus grasps an object. This entails a lot of complicated hardware. The present invention alleviates this problem by including an aspect of resiliency in certain grasping mechanism embodiments. In some of these embodiments, for example, a spring loaded, slideable interface or other resilient coupling is built into the grasping mechanism. By including, e.g., linear compliance in grasping mechanisms, it permits object nest locations to have hard push surfaces instead of compliant push surfaces. In these embodiments, a gripper apparatus pushes the sample plate or other object to be picked-up or dropped-off against a push surface to compress the springs of the resilient coupling. In addition, these push surfaces are typically designed into each object pick-up and drop-off location and vary, e.g., depending the configuration of the particular location. FIGS. 19 and 20 schematically illustrate examples of these types of push surfaces.

Referring again to FIGS. 8–10 and also now to FIGS. 13–18, a method of grasping an object with a resilient grasping mechanism is described. In particular, FIGS. 13A and B schematically illustrate the approach of grasping mechanism 20 to sample plate 25 positioned on station shelf 33 of station 30. FIG. 13A schematically illustrates the approach from a top view, while FIG. 13B schematically illustrates the approach from a perspective view. As shown, open arms A and B are resiliently coupled to body 22 via slideable interfaces 52. Before stops 50 of grasping mechanism 20 contact sample plate 25 there is no clearance or separation between spring stops 54 and the bodies of slideable interfaces 52. That is, the springs of slideable interfaces 52 are not compressed beyond their installed compression and slideable interfaces 52 are in their initial positions or "home states."

FIGS. 14A and B schematically illustrate stops 50 of grasping mechanism 20 in contact with sample plate 25. FIG. 14A schematically illustrates this contact from a top view, whereas FIG. 14B schematically illustrates the contact from a perspective view. As shown, when stops 50 contact sample plate 25, arms A and B resiliently slide in the opposite direction from the movement of boom 12 from the initial positions shown in FIGS. 13A and B. As also shown, arms A and B are open, that is, pivot members 35 have not contacted sample plate 25. The contact between stops 50 and sample plate 25 determine the y-axis position of the sample plate 25. In this process, several millimeters of clearance are typically produced between spring stops 54 and the bodies of slideable interfaces 52. One advantage of this grasping method is that the robot typically does not need to be programmed perfectly for each sample plate location and each type of sample plate.

FIGS. 15A and B schematically illustrate pivot members 35 contacting sample plate 25 as arms A and B grasp sample plate 25. In particular, FIG. 15A schematically illustrates the grasp from a top view, whereas FIG. 15B schematically illustrates the grasp from a perspective view. As shown, arms A and B remain away from their initial positions in opposition to the movement of boom 12 via slideable interfaces 52. That is, the clearance between spring stops 54 and the bodies of slideable interfaces 52 remains during this portion of the method. Further, as described above, the x-axis and z-axis positions of sample plate 25 are determined when pivot members contact sample plate 25. FIG. 16 further schematically shows the relative orientations of pivot members 35, stops 50, and sample plate 25 as grasping mechanism 20 grasps sample plate 25.

Figure 18:
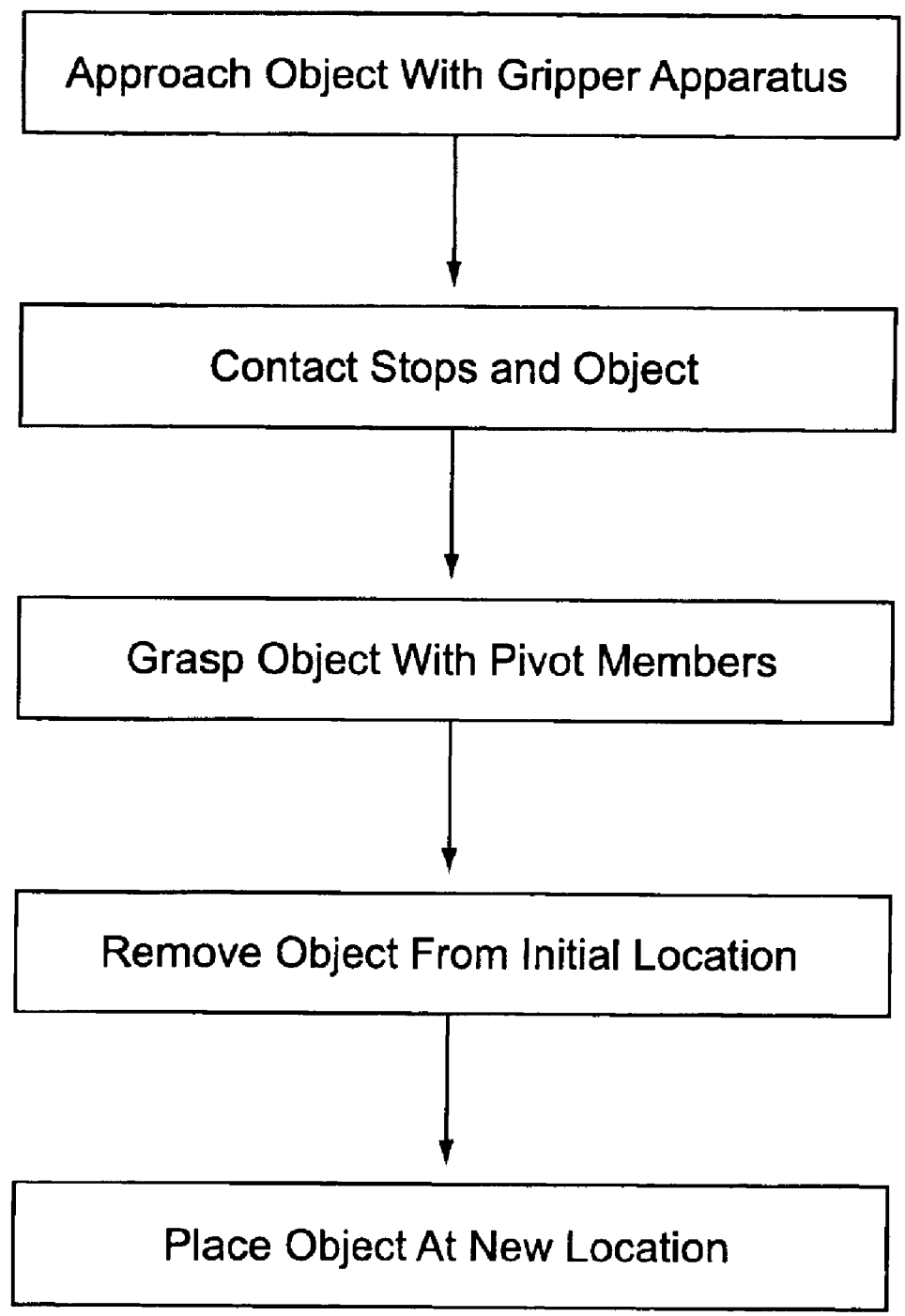
FIG. 18 is a block diagram illustrating one method of grasping an object with a gripper apparatus.

FIGS. 17A and B schematically illustrate grasping mechanism 20 removing sample plate 25 from station shelf 33. FIG. 17A schematically illustrates the removal from a top view, whereas FIG. 17B schematically illustrates the removal from a perspective view. As shown, as boom 12 withdraws from station 30, arms A and B slide back to their initial positions such that spring stops 54 and the bodies of slideable interfaces 52 are no longer separated from one another. FIG. 18 is a block diagram that further illustrates an embodiment of this method of grasping an object such that the y-axis position of the object is determined before the x-axis and z-axis positions of the object.

An optional method for dropping a sample plate off at a desired location is to perform essentially the reverse of the method described above for picking up a sample plate. In particular, grasping mechanism 20 moves sample plate 25 into contact with a push surface at the selected drop-off location such that, e.g., several millimeters of clearance between spring stops 54 and the bodies of slideable interfaces 52 are produced. That is, grasping mechanism 20 moves in the y-direction beyond the programmed theoretical location of the push surface by, e.g., about several millimeters. Examples of push surfaces are schematically illustrated in, e.g., FIGS. 19 and 20. Thereafter, arms A and B of grasping mechanism 20 are opened, releasing sample plate 25 from pivot members 35. During this step, grasping mechanism 20 is not moving in the y-direction so sample plate 25 remains in contact with both stops 50 and the push surface at the drop-off location. Subsequently, grasping mechanism 20 is moved away from sample plate 25 in the y-direction, relinquishing the clearance or over travel in slideable interfaces 52. Grasping mechanism 20 continues to move in the y-direction such that stops 50 pull away from contact with sample plate 25, leaving sample plate 25 at the drop-off location in contact with the push surface. The use herein of the terms "pick-up" and "drop-off" or variations thereof for a location refers to whether an object is being removed from or placed at that location, respectively.

An apparatus and method for grasping and positioning an object, such as the robotic gripper apparatus, are thus provided. One skilled in the art will appreciate that the present invention can be practiced by other than the preferred embodiments, which are presented in this description for purposes of illustration and not of limitation. It is noted that the practice of various equivalents for the particular embodiments discussed in this description is also within the scope of the invention.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A grasping mechanism, comprising movably coupled arms that are structured to grasp an object, wherein the arms are movably coupled to each other such that the arms can move towards or away from each other along a first axis, wherein at least one of the arms comprises a stop, wherein one or more of the arms comprises a pivot member having a support surface to support the object and a height adjusting surface that pushes the object into contact with the support surface when the arms grasp the object, and further wherein the arms are attached to a body that comprises a resilient coupling which allows the arms to move in a direction substantially prependicular to the first axis when the stop pushes the object against a push surface.

2. The grasping mechanism of claim 1, wherein the grasping mechanism is structured to grasp the object between the arms.

3. The grasping mechanism of claim 1, wherein the resilient coupling allows the arms to move along a y-axis.

4. The grasping mechanism of claim 1, wherein the arms comprise a polished or coated surface that reduces friction between the object and the arms, relative to an unpolished or non-coated surface, when the object is grasped by the arms.

5. The grasping mechanism of claim 1, wherein the arms comprise one or more rollers that reduce friction between the object and the grasping mechanism, relative to arms that lack the rollers, when the object is grasped by the arms.

6. The grasping mechanism of claim 1, further comprising the object.

7. The grasping mechanism of claim 6, wherein the object is selected from the group consisting of: a plate, a sample plate, a micro-well plate, a reaction block, a reaction block carrier, a sample holder, a petri dish, a test tube, a vial, a crucible, a reaction vessel, a reaction flask, a semi conductor wafer, a CD, and a tray.

8. The grasping mechanism of claim 1, wherein the stop is structured to determine a y-axis position of the object.

9. The grasping mechanism of claim 8, wherein the y-axis position of the object is determined with an accuracy to within about 0.1 millimeters.

10. The grasping mechanism of claim 1, wherein an interface between the arms and the body comprises at least one spring, which spring resiliently couples the arms to the body.

11. The grasping mechanism of claim 10, wherein the interface comprises a sliding interface.

12. The grasping mechanism of claim 1, wherein each support surface is disposed between two height adjusting surfaces, which height adjusting surfaces are angled to push the object into contact with the support surface when the object is grasped.

13. The grasping mechanism of claim 1, wherein the support surface and the height adjusting surface form a channel to grasp the object.

14. The grasping mechanism of claim 1, wherein the support surface comprises a substantially horizontal surface to support the object and the height adjusting surface comprises an angled surface that intersects with the substantially horizontal surface, which angled surface pushes the object into contact with the substantially horizontal surface when the arms grasp the object.

15. The grasping mechanism of claim 1, wherein the pivot member is resiliently coupled to the arm.

16. The grasping mechanism of claim 15, wherein the arm further comprises a stop that is resiliently coupled to the arm.

17. The grasping mechanism of claim 1, wherein the support surface determines an x-axis position of the object and the height adjusting surface determines a z-axis position of the object when the arms grasp the object.

18. The grasping mechanism of claim 17, wherein the x-axis and z-axis positions of the object are determined with an accuracy to within about 0.1 millimeters.

19. The grasping mechanism of claim 1, wherein the grasping mechanism is movably connected to a boom, which boom is movably connected to a base.

20. The grasping mechanism of claim 19, wherein the boom rotates about 360 degrees.

21. The grasping mechanism of claim 19, wherein the boom and the base comprise a robot.

22. The grasping mechanism of claim 19, wherein the boom moves vertically and horizontally.

23. The grasping mechanism of claim 22, wherein the boom extends and retracts.

24. The grasping mechanism of claim 19, further comprising at least one controller operably connected to the grasping mechanism, which controller controls movement of the grasping mechanism.

25. The grasping mechanism of claim 24, wherein the controller further controls movement of the boom.

26. The grasping mechanism of claim 25, wherein the controller comprises at least one logic device having one or more logic instructions that direct the boom to:
  contact the object with the grasping mechanism such that the object is pushed against the push surface by the stops, whereby the resilient coupling allows the arms to reversibly recede from an initial position; and
  grasp at least a section of the object with the arms, after which the arms advance at least substantially back to the initial position.

27. The grasping mechanism of claim 26, wherein the arms each comprise a channel and wherein the logic instructions further direct the grasping mechanism to partially close prior to the contacting step to position the section of the object at least partially within the channel.

28. The grasping mechanism of claim 26, wherein the logic instructions further direct the boom to remove the object from a first position and place the object at a second position.

29. The grasping mechanism of claim 24, further comprising at least one sensor that communicates with the controller to determine a location of the grasping mechanism relative to the object.

30. The grasping mechanism of claim 29, wherein the sensor is selected from the group consisting of: an optical sensor, a photoelectric sensor, an infrared sensor, a position sensor, a laser distance sensor, and a magnetic sensor.

31. The grasping mechanism of claim 19, further comprising a deflectable member that deflectively couples the grasping mechanism to the boom, which deflectable member deflects when the grasping mechanism contacts the object or another item with a force greater than a preset force.

32. The grasping mechanism of claim 31, wherein the deflectable member comprises a breakaway.

33. A gripper apparatus, comprising:
at least one robot comprising a boom;
at least one grasping mechanism comprising movably coupled arms that are structured to grasp an object, wherein at least one of the arms comprises a stop, wherein one or more of the arms comprise a pivot member having a support surface to support the object and a height adjusting surface that pushes the object into contact with the support surface when the arms grasp the object, and wherein the grasping mechanism is resiliently coupled to the boom by the resilient coupling which allows the arms to reversibly recede from an initial position when the stop pushes the object against a push surface; and
at least one controller operably connected to at least the grasping mechanism, which controller controls movement of the grasping mechanism.

34. The gripper apparatus of claim 33, wherein the grasping mechanism comprises two arms.

35. The gripper apparatus of claim 33, wherein the grasping mechanism is structured to grasp the object between the arms.

36. The gripper apparatus of claim 33, wherein the controller is operably connected to the robot and further controls movement of the robot.

37. The gripper apparatus of claim 33, wherein the boom moves vertically and horizontally.

38. The gripper apparatus of claim 37, wherein the boom extends and retracts.

39. The gripper apparatus of claim 33, wherein the arms each comprise at least one support surface and at least one height adjusting surface.

40. The gripper apparatus of claim 39, wherein each support surface is disposed between two height adjusting surfaces, which height adjusting surfaces are angled to push the object into contact with the support surface when the object is grasped.

41. The gripper apparatus of claim 39, wherein the support surface comprises a substantially horizontal surface to support the object and the height adjusting surface comprises an angled surface that intersects with the substantially horizontal surface, which angled surface pushes the object into contact with the substantially horizontal surface when the arms grasp the object.

42. The gripper apparatus of claim 33, wherein the pivot member is resiliently coupled to the arms.

43. The gripper apparatus of claim 33, wherein the resilient coupling between the grasping mechanism and the boom comprises at least one spring, which spring resiliently couples the grasping mechanism to the boom.

44. The gripper apparatus of claim 43, wherein the resilient coupling comprises a sliding interface.

45. The gripper apparatus of claim 33, wherein the controller comprises at least one logic device having one or more logic instructions that direct the gripper apparatus to:
contact the object with the grasping mechanism such that the object is pushed against the push surface by the stop, whereby the resilient coupling allows the arms to reversibly recede from the initial position; and
grasp at least a section of the object with the arms, after which the arms advance at least substantially back to the initial position.

46. The gripper apparatus of claim 45, wherein the logic instructions further direct the gripper apparatus to remove the object from a first position and place the object at a second position.

47. The gripper apparatus of claim 33, further comprising a deflectable member that defectively couples the grasping mechanism to the boom, which deflectable member deflects when the grasping mechanism contacts an item with a force greater than a preset force.

48. The gripper apparatus of claim 47, wherein the deflectable member comprises a breakaway.

49. A gripper apparatus, comprising:
a grasping mechanism comprising movably coupled arms that are structured to grasp an object, wherein at least one arm comprises a stop and a pivot member having:
a) a support surface to support the object; and
b) a height adjusting surface that pushes the object into contact with the support surface;
such that when the arms grasp the object the support surface and the height adjusting surface determine at least a z-axis position of the object;
a deflectable member that defectively couples the grasping mechanism to a boom;
a controller coupled to the grasping mechanism, which controller controls movement of the grasping mechanism; and,
at least one push surface against which the gripper apparatus pushes the object into contact with the stop to determine a y-axis position of the object.

50. A method of grasping an object, the method comprising:
providing a gripper apparatus that comprises a controller coupled grasping mechanism having movably coupled arms that are structured to grasp an object, wherein at least one arm comprises a stop, wherein one or more of the arms comprise a pivot member having a support surface to support the object and a height adjusting surface that pushes the object into contact with the support surface when the arms grasp the object, and wherein at least two grasping mechanism components are resiliently coupled to each other by a resilient coupling;
contacting the object such that the object is pushed against a push surface by the stop, whereby the resilient coupling allows the arms to reversibly recede from an initial position; and,
grasping at least a section of the object with the arms, after which the arms advance at least substantially back to the initial position.

51. The method of claim 50, further comprising removing the object from a first position and placing the object at a second position.

* * * * *